US012047203B2

(12) United States Patent
Woo et al.

(10) Patent No.: US 12,047,203 B2
(45) Date of Patent: Jul. 23, 2024

(54) METHOD FOR TRACKING CHANNEL IN WIRELESS AV SYSTEM AND WIRELESS DEVICE USING SAME

(71) Applicant: LG ELECTRONICS INC., Seoul (KR)

(72) Inventors: Kyungsoo Woo, Seoul (KR); Kyuin Lee, Seoul (KR); Joongkwan Huh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 361 days.

(21) Appl. No.: 17/594,297

(22) PCT Filed: May 8, 2019

(86) PCT No.: PCT/KR2019/005454
§ 371 (c)(1),
(2) Date: Oct. 11, 2021

(87) PCT Pub. No.: WO2020/226202
PCT Pub. Date: Nov. 12, 2020

(65) Prior Publication Data
US 2022/0166650 A1  May 26, 2022

(51) Int. Cl.
*H04L 25/02* (2006.01)
*H04J 13/00* (2011.01)
*H04L 27/26* (2006.01)

(52) U.S. Cl.
CPC ...... *H04L 25/0204* (2013.01); *H04J 13/0014* (2013.01); *H04L 27/2607* (2013.01)

(58) Field of Classification Search
CPC ............. H04L 25/0204; H04L 27/2607; H04L 25/03159; H04L 25/0224; H04L 25/0236;
(Continued)

(56) References Cited

U.S. PATENT DOCUMENTS

2015/0280862 A1   10/2015  Teplitsky et al.
2018/0062902 A1*   3/2018  Gagiev .................. H04L 23/00

FOREIGN PATENT DOCUMENTS

| KR | 1020120127723 | 11/2012 |
| KR | 1020180004402 | 1/2018 |
| WO | 2018048493    | 3/2018 |

OTHER PUBLICATIONS

PCT International Application No. PCT/KR2019/005454, International Search Report dated Feb. 7, 2020, 4 pages.
(Continued)

*Primary Examiner* — Dady Chery
(74) *Attorney, Agent, or Firm* — LEE, HONG, DEGERMAN, KANG & WAIMEY

(57) ABSTRACT

A method by which a first wireless device tracks a channel in a wireless AV system, according to one embodiment of the present invention, comprises the steps of: receiving a radio signal including a first part related to a preamble and a second part related to a data block and a GI; estimating an initial channel on the basis of the preamble; estimating a residual channel on the basis of the GI, wherein a reconstruction sequence reconstructed on the basis of a Golay sequence having a predetermined length is applied to the GI; and updating a channel on the basis of first information acquired on the basis of the initial channel estimation and second information acquired on the basis of the residual channel estimation.

9 Claims, 25 Drawing Sheets

(A)

(B)

(58) Field of Classification Search
CPC ............ H04L 27/26132; H04L 27/2603; H04J 13/0014; H04J 13/107
See application file for complete search history.

(56) References Cited

OTHER PUBLICATIONS

LAN/MAN Standards Committee of the IEEE Computer Society, "Wireless LAN Medium Access Control (MAC) and Physical Layer (PHY) Specifications," IEEE P802.11-REVmc TM/D8.0, Aug. 2016, Draft Standard for Information technology—Telecommunications and information exchange between systems Local and metropolitan area networks—Specific requirements, 3775 pages.

* cited by examiner (A)

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 12

METHOD FOR TRACKING CHANNEL IN WIRELESS AV SYSTEM AND WIRELESS DEVICE USING SAME

CROSS-REFERENCE TO RELATED APPLICATIONS

This application is the National Stage filing under 35 U.S.C. 371 of International Application No. PCT/KR2019/005454, filed on May 8, 2019, the contents of which are all incorporated by reference herein in its entirety.

BACKGROUND

Field of the Disclosure

The present specification relates to a wireless device, and more particularly, to a method of performing channel tracking in a wireless AV system, and a wireless device using the method.

Related Art

Wireless gigabit alliance (hereinafter, WiGig) is an organization which promotes to adopt a multi-gigabit speed wireless communication technique operating at an unlicensed frequency band greater than or equal to 60 GHz, and is a representative name of IEEE 802.11ad and IEEE802.11ay (hereinafter '11ad, 11ay').

In the IEEE 802.11ad, according to a transmission/reception method used in a physical layer, a mode is classified into a control mode, a single carrier mode (hereinafter, 'SC mode'), and a low power SC mode.

Meanwhile, in the IEEE 802.11ay, according to a transmission/reception method used in a physical layer, a mode is classified into a control mode, an SC mode, and an orthogonal frequency division multiplexing (OFDM) mode.

A mandatory mode for supporting the WiGig includes the control mode and the SC mode. In addition, the IEEE802.11ay shall maintain backward compatibility with the IEEE 802.11ad.

SUMMARY

The present specification provides a method of performing channel tracking in a wireless AV system having improved performance by reducing inter-symbol interference (ISI) and providing low latency, and a wireless device using the method.

A method of performing channel tracking in a wireless AV system, performed by a first wireless device, according to one present embodiment includes: receiving a radio signal including a first part associated with a preamble and a second part associated with a data block and a guard interval (GI) from a second wireless device; estimating an initial channel, based on the preamble; estimating a residual channel, based on the GI; applying a reconstruction sequence reconstructed based on a Golay sequence having a predetermined length to the GI; and updating a channel, based on first information obtained based on the estimation of the initial channel and second information obtained based on the estimation of the residual channel.

According to an embodiment of the present specification, there may be provided a method of performing channel tracking in a wireless AV system having improved performance by reducing inter-symbol interference (ISI) and providing low latency, and a wireless device using the method.

BRIEF DESCRIPTION OF THE DRAWINGS

FIG. 8 is a diagram showing a PPDU structure according to one present embodiment.

FIG. 12 to FIG. 14 show a data field included in a PPDU based on a GI in an SC mode.

DESCRIPTION OF EXEMPLARY EMBODIMENTS

Hereinafter, embodiments related to the present specification will be described in detail with reference to the accompanying drawings. The suffixes "module" and "unit" for components that are used in the following description are given or interchangeably used in order to merely facilitate the description of the present specification. And, therefore, such suffixes do not have any distinctive meaning or role by themselves.

A wireless device according to an embodiment of the present specification is, for example, an intelligent display device having computer supporting functions added to a broadcast receiving function. And, therefore, while being dedicated to the broadcast receiving function, since an Internet function, and so on, are added herein, the wireless device may also be equipped with an easy-to-use interface, such as a handwriting input device, a touch screen, or a spatial remote controller, and so on. Moreover, with the support of a wired or wireless internet function, the wireless device may access the Internet and other computers, thereby being capable of performing various functions, such as receiving/sending e-mails, web browsing, banking, or playing games. In order to achieve such functions, a standardized universal OS may be used.

Herein, for example, since various types of applications may be freely added or deleted within a universal OS kernel, the wireless device that is described in the present specification may perform various user-friendly functions. More specifically, for example, the wireless device may be a network TV, an HBBTV, a smart TV, an LED TV, an OLED TV, and so on. And, in some cases, the wireless device is also applicable to smartphones.

Figure 1:
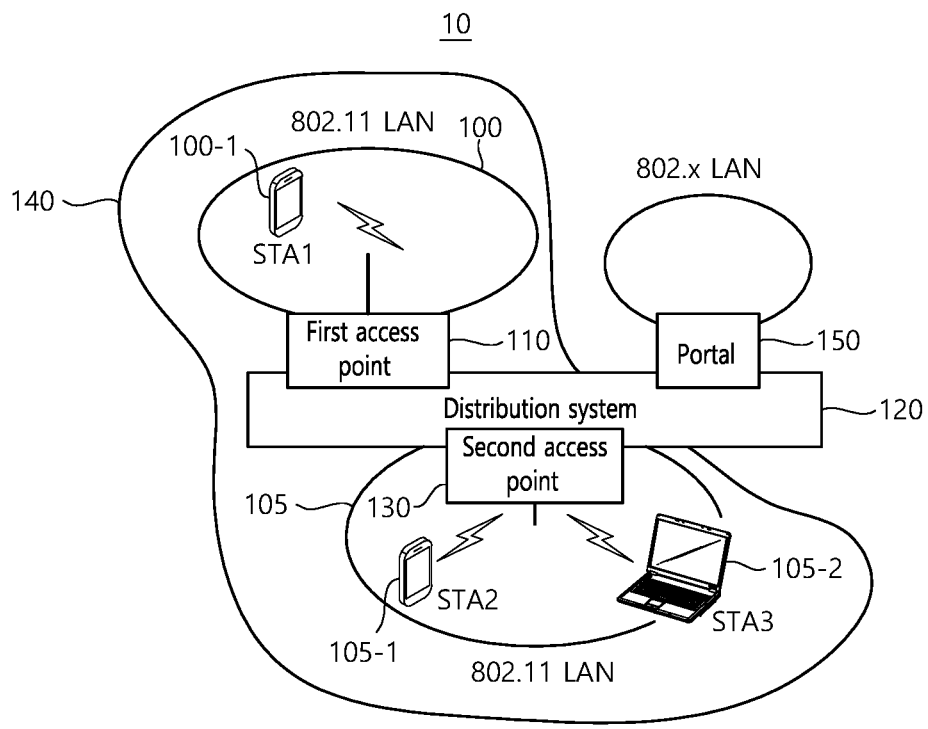
FIG. 1 is a conceptual diagram showing a structure of a wireless LAN system.
Figure 1:
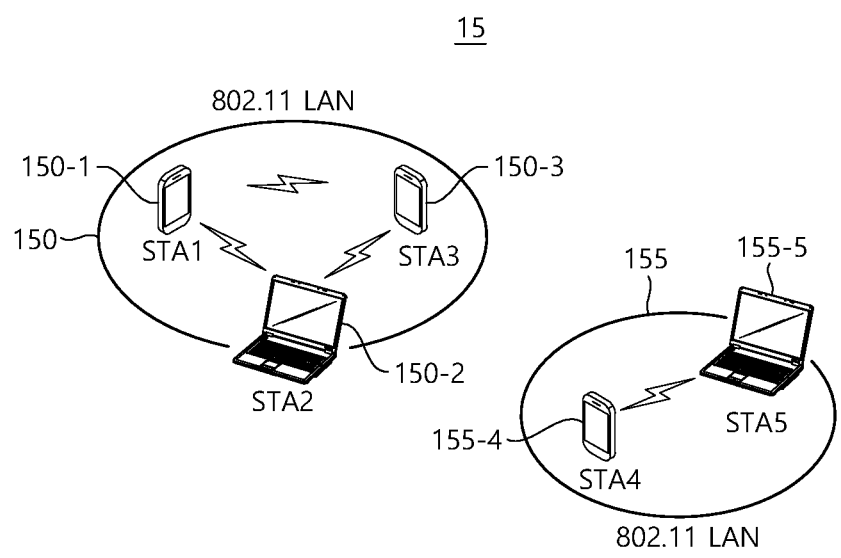

FIG. 1 is a conceptual diagram showing a structure of a wireless LAN system. FIG. 1(A) shows a structure of an infrastructure network of Institute of Electrical and Electronic engineers (IEEE) 802.11.

Referring to (A) of FIG. 1, the wireless system (10) shown in (A) of FIG. 1 may include at least one basic service set (BSS) (100, 105). A BSS is a set of an access point (hereinafter referred to as 'AP') and a station (hereinafter referred to as 'STA') that can perform communication between one another by successfully establishing synchronization and does not refer to a specific area.

For example, a first BSS (100) may include a first AP (110) and a single first STA (100-1). A second BSS (105) may include a second AP (130) and one or more STAs (105-1, 105-2).

The infrastructure BSSs (100, 105) may include at least one STA, APs (110, 130) providing a distribution service, and a distribution system (DS) (120) that connects the multiple APs.

The distribution system (120) may implement an extended service set (ESS) (140) by connecting the plurality of BSSs (100, 105). The ESS (140) may be used as a term indicating a network that connects one or more APs (110, 130) through the distribution system (120). One or more APs included in the single ESS (140) may have the same service set identifier (hereinafter referred to as 'SSID').

A portal (150) may serve as a bridge for connecting the wireless LAN network (IEEE 802.11) to another network (e.g., 802.X).

In the wireless LAN system having the structure shown in (A) of FIG. 1, a network between the APs (110, 130) and a network between the APs (110, 130) and the STAs (100-1, 105-1, 105-2) can be implemented.

(B) of FIG. 1 is a conceptual diagram showing an independent BSS. Referring to (B) of FIG. 1, a wireless LAN system (15) shown in (B) of FIG. 1 may establish a network between STAs without the APs (110, 130) such that the STAs can perform communication, unlike the wireless LAN system of (A) of FIG. 1. A network established between STAs without the APs (110, 130) for communication is defined as an ad-hoc network or an independent basic service set (hereinafter referred to as 'IBSS').

Referring to (B) of FIG. 1, the IBSS (15) is a BSS operating in an ad-hoc mode. The IBSS does not have a centralized management entity because an AP is not included therein. Accordingly, STAs (150-1, 150-2, 150-3, 155-4, 155-5) are managed in a distributed manner in the IBSS (15).

All STAs (150-1, 150-2, 150-3, 155-4, 155-5) of the IBSS may be configured as mobile STAs and are not allowed to access a distributed system. All STAs of the IBSS configure a self-contained network.

An STA mentioned in the present disclosure is an arbitrary functional medium including medium access control (MAC) conforming to regulations of Institute of Electrical and Electronics Engineers (IEEE) 802.11 and a physical layer interface for a wireless medium, and a broad meaning of this term may include both an AP and a non-AP station.

The STA mentioned in the present disclosure may also be referred to by using various terms, such as a mobile terminal, a wireless device, a wireless transmit/receive unit (WTRU), a user equipment (UE), a mobile station (MS), a mobile subscriber unit, and, simply, a user.

Figure 2:
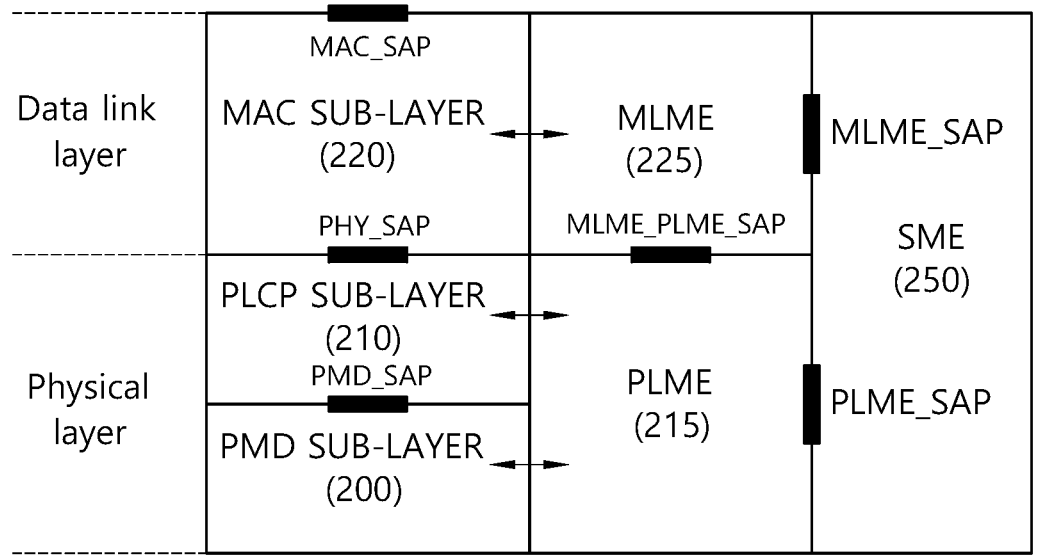
FIG. 2 is a conceptual diagram of a hierarchical architecture of a wireless LAN system supported by IEEE 802.11.

FIG. 2 is a conceptual diagram of a hierarchical architecture of a wireless LAN system supported by IEEE 802.11. Referring to FIG. 2, the hierarchical architecture of the wireless LAN system may include a physical medium dependent (PMD) sublayer (200), a physical layer convergence procedure (PLCP) sublayer (210), and a medium access control (MAC) sublayer (220).

The PMD sublayer (200) may serve as a transport interface for transmitting and receiving data between STAs. The PLCP sublayer (210) is implemented such that the MAC sublayer (220) can operate with minimum dependency on the PMD sublayer (200).

The PMD sublayer (200), the PLCP sublayer (210), and the MAC sublayer (220) may conceptually include a management entity. For example, a manager of the MAC sublayer (220) is called a MAC layer management entity (MLME) (225). A manager of the physical layer is called a PHY layer management entity (PLME) (215).

These managers may provide interfaces for performing layer management operation. For example, the PLME (215) may be connected to the MLME (225) to perform a management operation of the PLCP sublayer (210) and the PMD sublayer (200). The MLME (225) may be connected to the PLME (215) to perform a management operation of the MAC sublayer (220).

In order to perform correct MAC layer operation, an STA management entity (SME) (250) may be provided. The SME (250) may be operated as an independent component in each layer. The PLME (215), the MLME (225), and the SME (250) may transmit and receive information based on primitive.

The operation in each sublayer will be briefly described below. For example, the PLCP sublayer (210) transfers a MAC protocol data unit (MPDU) received from the MAC sublayer (220) to the PMD sublayer (200) or transfers a frame from the PMD sublayer (200) to the MAC sublayer (220) between the MAC sublayer (220) and the PMD sublayer (200) according to an instruction of the MAC layer.

The PMD sublayer (200) is a sublayer of PLCP and may perform data transmission and reception between STAs through a wireless medium. An MPDU transferred from the MAC sublayer (220) is referred to as a physical service data unit (PSDU) in the PLCP sublayer (210). Although the MPDU is similar to the PSDU, an individual MPDU may differ from an individual PSDU when an aggregated MPDU corresponding to an aggregation of a plurality of MPDU is transferred.

The PLCP sublayer (210) adds an additional field including information that is needed by a transceiver of the physical layer during a process of receiving a PSDU from the MAC sublayer (220) and transferring the PSDU to the PMD sublayer (200). At this point, the added field may be a PLCP preamble and a PLCP header added to the PSDU and tail bits needed for returning a convolution encoder to a zero state, and the like.

The PLCP sublayer (210) adds the aforementioned field to the PSDU to generate a PLCP protocol data unit (PPDU) and transmits the PPDU to a receiving station through the PMD sublayer (200), and the receiving station receives the PPDU and obtains information needed for data restoration from the PLCP preamble and the PLCP header in order to restore (or recover) data.

Figure 3:
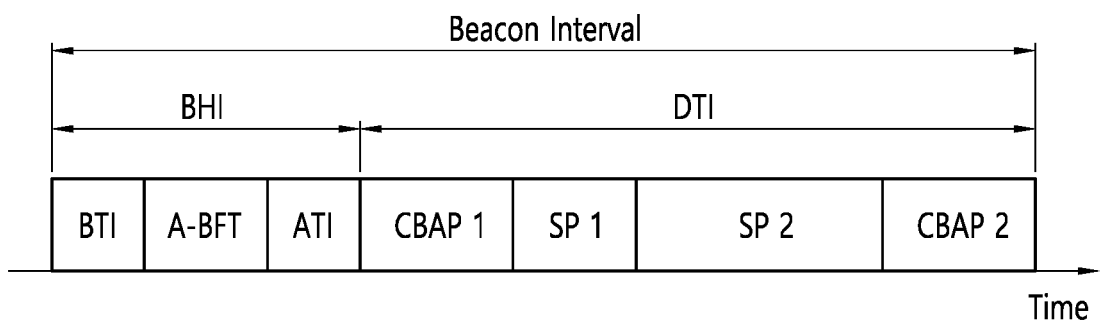
FIG. 3 is a diagram for describing an access period within a beacon interval.

FIG. 3 is a diagram for describing an access period within a beacon interval.

Referring to FIG. 3, time of a wireless medium may be defined based on a beacon interval between a beacon frame and a beacon frame. For example, a beacon interval may be 1024 milliseconds (msec).

A plurality of sub-periods within a beacon interval may be referred to as an access period. Different access periods within one beacon interval may have different access rules.

For example, information on an access period may be transmitted, by an AP or Personal basic service set Control Point (PCP), to a non-AP STA or non-PCP.

Referring to FIG. 3, one beacon interval may include a Beacon Header Interval (hereinafter referred to as 'BHI') and a Data Transfer Interval (hereinafter referred to as 'DTI').

For example, a BHI may be a time period starting from a target beacon transmission time (hereinafter referred to as 'TBTT') of a beacon interval and ending before the start (or beginning) of a DTI.

The BHI of FIG. 3 may include a Beacon Transmission Interval (hereinafter referred to as 'BTI'), an Association Beamforming Training (hereinafter referred to as 'A-BFT'), and an Announcement Transmission Interval (hereinafter referred to as 'ATI').

For example, a BTI may be a time period starting from the beginning (or start) of a first beacon frame to the end of a last beacon frame, which are transmitted by a wireless UE within a beacon interval. That is, a BTI may be a period during which one or more DMG beacon frames may be transmitted.

For example, an A-BFT may be a period during which beamforming training is performed by the STA that has transmitted the DMG beacon frame(s) during the preceding BTI.

For example, an ATI may be a Request-Response based management access period between a PCP/AP and a non-PCP/non-AP STA. The Data Transfer Interval (hereinafter referred to as 'DTI') of FIG. 3 may be a period during which frames are exchanged between multiple STAs.

As shown in FIG. 3, one or more Contention Based Access Periods (hereinafter referred to as 'CBAP') and one or more Service Periods (hereinafter referred to as 'SP') may be allocated to the DTI.

A DTI schedule of the beacon interval shown in FIG. 3 may be communicated through an Extended Schedule element, which is included in the beacon frame (or Announcement frame). That is, an Extended Schedule element may include schedule information for defining multiple allocations that are included in the beacon interval.

Detailed descriptions of the beacon frame are mentioned in Section 9.4.2.132 of the IEEE Draft P802.11-REVmc™/D8.0, August 2016 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in August 2016.

Although FIG. 3 illustrates an example of two CBAPs and two SPs being allocated for one DTI, this is merely exemplary. And, therefore, it shall be understood that the present specification will not be limited only to this.

Figure 4:
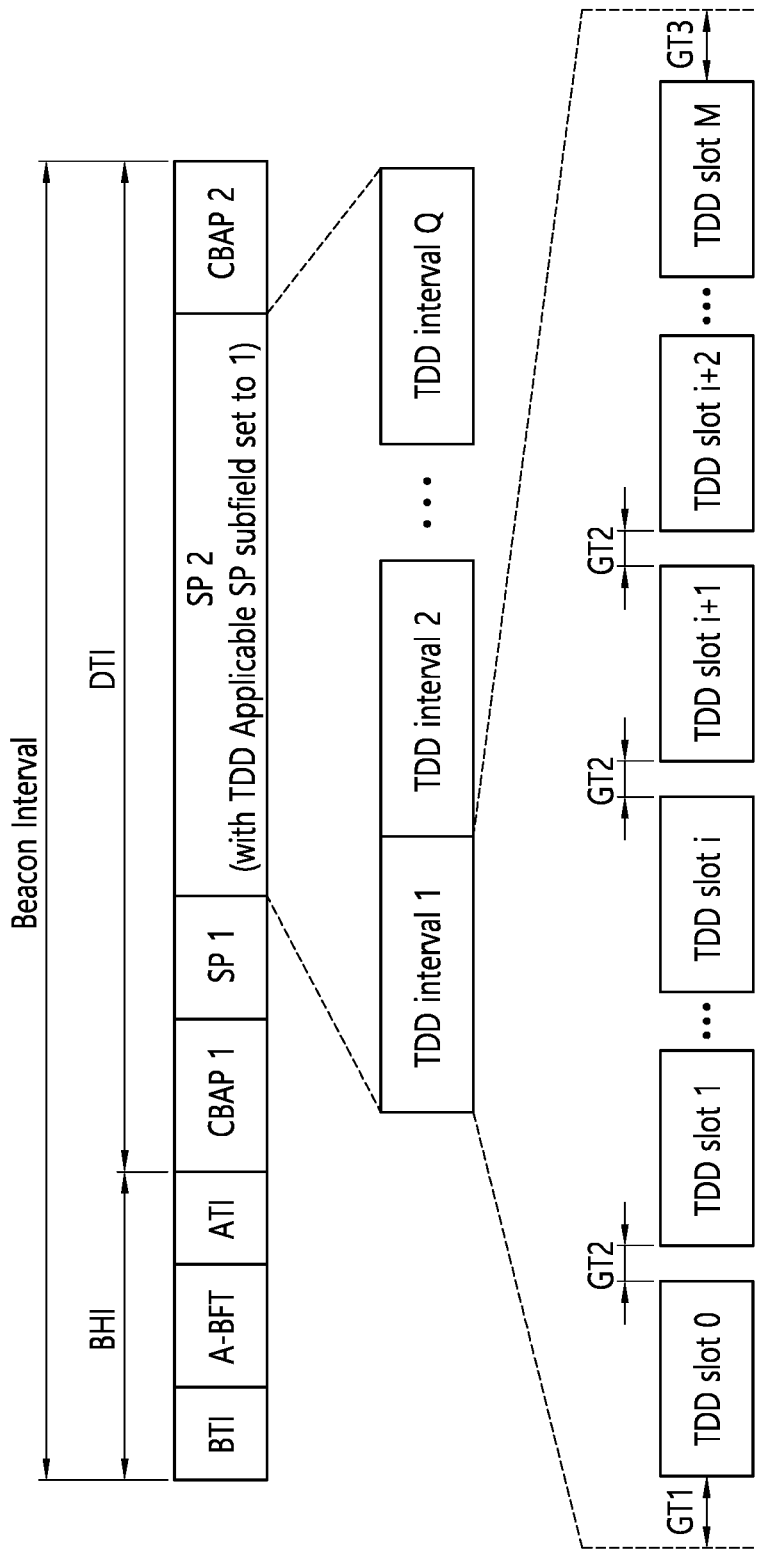
FIG. 4 is a conceptual diagram of a time division duplex (TDD) SP structure.

FIG. 4 is a conceptual diagram of a time division duplex (TDD) SP structure.

Referring to FIG. 1 to FIG. 4, among a plurality of allocation fields (not shown) that are included in the Extended Schedule element, which is included in a beacon frame, an allocation field for a second Service Period (SP2) of FIG. 4 may include a first subfield and a second subfield.

For example, the first subfield being included in the allocation field for the second Service Period (SP2) of FIG. 4 may be set to a value indicating SP allocation. Additionally, the second subfield being included in the allocation field for the second Service Period (SP2) of FIG. 4 may be set to a value indicating that the second service period (SP2) is a TDD SP that is based on TDD channel access.

In the present specification, when information for a TDD SP is included in the Extended Schedule element, the Extended Schedule element may be included in each beacon frame that is being transmitted.

Additionally, when an Extended Schedule element is transmitted at least one time from a beacon interval, with the exception for any special cases, the content of the Extended Schedule element may not be changed.

Referring to FIG. 4, the structure of the second service period (SP2), which is a TDD SP, may include a plurality of consecutive and adjacent TDD intervals (TDD interval 1~TDD interval Q, wherein Q is an integer). For example, a number of the plurality of TDD intervals of FIG. 4 may be equal to Q.

Additionally, each of the plurality of TDD intervals may include one or more TDD slots. For example, a first TDD interval (TDD interval 1) may include M+1 (wherein M is an integer) number of slots.

For example, a time interval starting from a start point of the first TDD interval (TDD interval 1) up to before a start point of a first TDD slot (i.e., TDD Slot 0), may be defined as a first guard time (hereinafter referred to as 'GT1').

For example, a time interval between each TDD slot included in the first TDD interval (TDD interval 1) may be defined as a second guard time (GT2).

For example, a time interval starting from an end point of an (M+1)th TDD slot (TDD slot M) up to an end point of the first TDD interval (TDD interval 1) may be defined as a third guard time (GT3).

For example, each of the plurality of TDD intervals (TDD interval 1~TDD interval Q) may have the same length. Each of the M+1 number of TDD slots (e.g., TDD slot 0~TDD slot M of FIG. 4) included in one TDD interval (e.g., TDD interval 1 of FIG. 4) may have a different length.

Referring to FIG. 4, the structure(s) of one or more TDD slots being included in the first TDD interval (i.e., TDD interval 1) may be repeatedly applied to the remaining TDD intervals (i.e., TDD interval 2~TDD interval Q).

Figure 5:
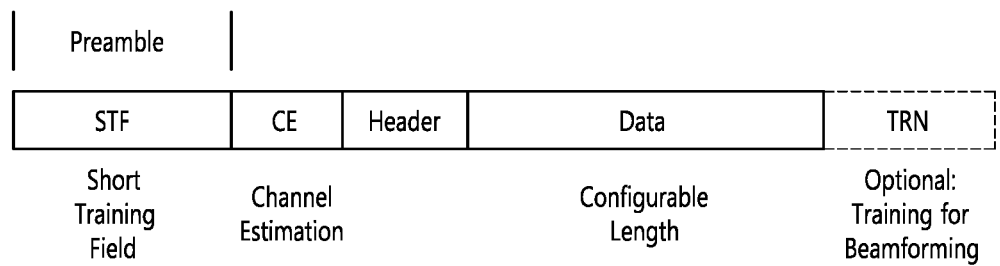
FIG. 5 is a diagram for describing a physical configuration of a related art radio frame.

FIG. 5 is a diagram for describing a physical configuration of a related art radio frame.

Referring FIG. 5, it is assumed that a Directional Multi-Gigabit (DMG) physical layer commonly includes the fields shown in FIG. 5. However, depending upon each mode, there may be differences in the regulation method and modulation/coding scheme(s) used for each separate field.

A preamble of the radio frame shown in FIG. 5 may include a Short Training Field (STF) and a Channel Estimation (CE) field. Additionally, the radio frame may include a header field, a data field for a payload, and a Training (TRN) field for beamforming.

Figure 6:
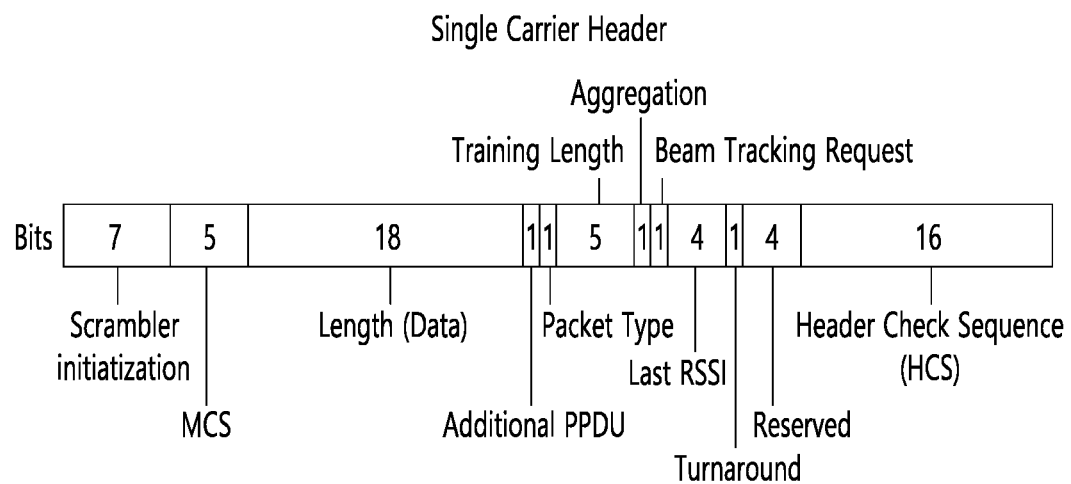
FIG. 6 and FIG. 7 are diagrams specifically showing a header field included in a radio frame.
Figure 7:
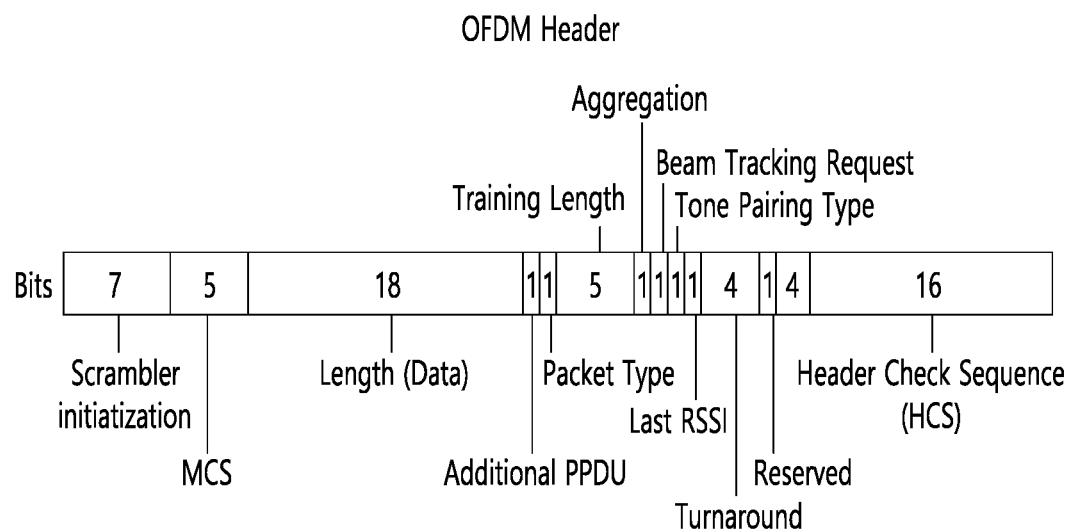

FIG. 6 and FIG. 7 are diagrams specifically showing a header field included in a radio frame.

Referring to FIG. 6, the diagram shows a case where a Single Carrier (SC) mode is used. In the SC mode, the header field may include information, such as information indicating an initial value for scrambling, a Modulation and Coding Scheme (MCS), information indicating data length, information indicating the presence or absence of an additional Physical Protocol Data Unit (PPDU), a packet type, a training length, performance or non-performance of aggregation, presence or absence of a beam training request, a last Received Signal Strength Indicator (RSSI), performance or non-performance of truncation, Header Check Sequence (HCS), and so on. Additionally, as shown in FIG. 6, the header has 4 bits of reserved bits, and such reserved bits may be used as described below in the following description.

Referring to 7, the diagram shows a detailed configuration of the header field, when an OFDM mode is applied. For example, when the OFDM mode is applied, the header field may include information, such as information indicating an initial value for scrambling, an MCS, information indicating data length, information indicating the presence or absence of an additional PPDU, a packet type, a training length, performance or non-performance of aggregation, presence or absence of a beam training request, a last RSSI, performance or non-performance of truncation, Header Check Sequence (HCS), and so on.

As shown in FIG. 7, the header has 2 bits of reserved bits, and such reserved bits may be used as described below in the following description, just as in the case of FIG. 6.

Channel bonding and MIMO technology are adopted in the IEEE 802.11ay. In order to implement the channel bonding and MIMO technology in 11ay, a new PPDU structure is needed. That is, when using the conventional (or existing) 11ad PPDU structure, there are limitations in implementing the channel bonding and MIMO technology while supporting a legacy UE at the same time.

In the present specification, a new field for an 11ay UE may be defined after the legacy preamble and legacy header field that are used for supporting the legacy UE. Herein, the channel bonding and MIMO technology may be supported based on the newly defined field.

FIG. 8 is a diagram showing a PPDU structure according to an embodiment of the present disclosure. In FIG. 8, a horizontal axis may correspond to a time domain, and a vertical axis may correspond to a frequency domain.

When the channel bonding scheme is applied for two or more channels (e.g., CH1, CH2 of FIG. 8), a frequency band having a predetermined size (e.g., a 400 MHz band) may exist between frequency bands (e.g., 1.83 GHz) being used in each channel. In case of a Mixed mode, when a legacy preamble (e.g., L-STF, L-CE of FIG. 8) is duplicated and transmitted through each channel, the present embodiment may consider a transmission of a new STF and CE field (i.e., gap filling) together with the legacy preamble at the same time through a 400 MHz band between each channel.

In this case, as shown in FIG. 8, the PPDU structure according to the present disclosure may have a structure of transmitting an ay STF, ay CE, ay header B, and payload through a wideband after the legacy preamble, legacy header, and ay header A. Therefore, the ay header, ay payload fields, and so on being transmitted after the header field may be transmitted through channels that are used for bonding. Hereinafter, in order to differentiate the ay header from the legacy header, the ay header may also be referred to as an enhanced directional multi-gigabit (EDMG) header, and the corresponding term may be interchangeably used.

For example, a total of 6 or 8 channels (each 2.16 GHz) may exist in 11ay, and a maximum of 4 channels may be bonded and transmitted to a single STA. Accordingly, the ay header and ay payload may be transmitted through 2.16 GHz, 4.32 GHz, 6.48 GHz, 8.64 GHz bandwidths.

Alternatively, a PPDU format corresponding to a case where the legacy preamble is repeatedly transmitted without performing Gap-Filling may also be considered.

In this case, since Gap-Filling is not performed, without the GF-STF and GF-CE fields, which are marked in dotted lines in FIG. 8, the ay STF, ay CE, and ay header B are transmitted through a wideband after the legacy preamble, legacy header, and ay header A.

Figure 9:
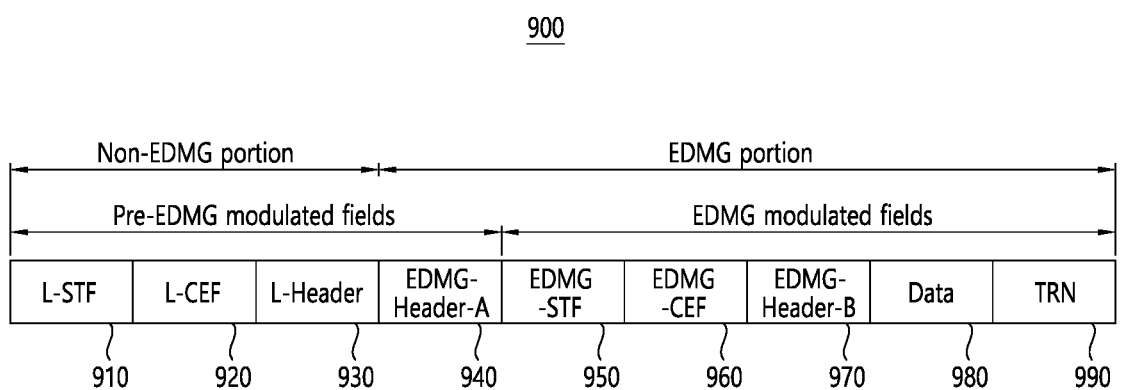
FIG. 9 is a diagram showing a PPDU structure according to one present embodiment.

FIG. 9 is a diagram showing a PPDU structure according to an embodiment of the present disclosure.

Referring to FIG. 9, a PPDU (900) format that is applicable to the 11ay system may include a legacy-Short Training Field (L-STF) (910), a legacy-channel estimation field (L-CEF) (920), an L-Header field (930), an EDMG-Header-A field (940), an EDMG-STF (950), an EDMG-CEF (960), an EDMG-Header B field (970), a Data field (980), and a training (TRN) field (990).

For example, the above-mentioned fields (910~990) may be selectively included in accordance with the PPDU format (e.g., SU PPDU, MU PPDU, and so on).

For example, the part including the L-STF (910), L-CEF (920), and L-header field (930) may be referred to as a Non-EDMG portion, and the remaining part (940~990) may be referred to as an EDMG portion.

Meanwhile, the L-STF (910), L-CEF (920), L-Header field (930), and EDMG-Header-A field (940) may be referred to as pre-EDMG modulated fields, and the remaining parts (950~990) may be referred to as EDMG modulated fields.

For example, the (legacy) preamble part of the PPDU (900) may be used for packet detection, Automatic Gain Control (AGC), frequency offset estimation, synchronization), instruction for modulation (SC or OFDM), and channel estimation.

Meanwhile, the preamble format of the PPDU (900) may be commonly applied for an OFDM packet and an SC packet. In this case, the preamble of the PPDU (900) may be configured of a Short Training Field (STF) and a Channel Estimation (CE) field that is located after the STF.

Figure 10:
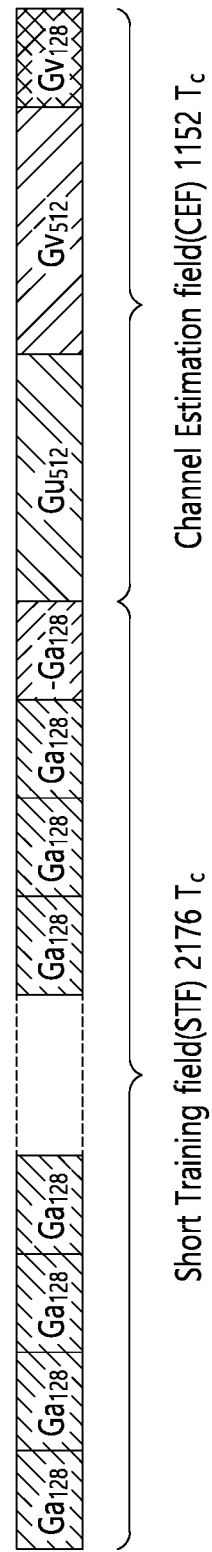
FIG. 10 is an exemplary diagram showing a legacy preamble.

FIG. 10 is an exemplary diagram showing a legacy preamble.

Referring to FIG. 9 and FIG. 10, an L-STF 910 of FIG. 10 is configured such that a Ga128(n) sequence having a length of 128 is repeated 16 times, followed by a −Ga128(n) sequence. Herein, a waveform for the STF may be expressed based on Equation 1 below.

$$r_{STF}(nT_C) = \begin{cases} (Ga_{128}(n \bmod 128))\exp\left(j\pi\frac{n}{2}\right) & n = 0, 1, \ldots, 16 \times 128 - 1 \\ (-Ga_{128}(n \bmod 128))\exp\left(j\pi\frac{n}{2}\right) & n = 16 \times 128, \ldots, 17 \times 128 - 1 \end{cases}$$ [Equation 1]

Herein, a Golay sequence (e.g., Ga128(n), Gb128(n), Ga64(n), Gb64(n), Ga32(n), Gb32(b)) used in a legacy part may be used in preamble, single carrier guard interval, beam refinement TRN-R/T, and ACG fields. The Golay sequence may be named as 3 pairs of complementary sequences.

A subscript of the Golay sequence used in the legacy part indicates a length of a sequence. The Golay sequences used in the legacy part may be generated based on a recursive procedure of Equation 2 below.

$$A_0(n) = \delta(n)$$

$$B_0(n) = \delta(n)$$

$$A_k(n) = W_k A_{k-1}(n) + B_{k-1}(n - D_k)$$

$$B_k(n) = W_k A_{k-1}(n) - B_{k-1}(n - D_k)$$ [Equation 2]

For example, in the procedure of Equation 2, $A_k(n)$ and $B_k(n)$ are 0 when $n < 0$ or $n \geq 2^k$.

For example, $Ga_{128}(n) = A_7(128-n)$, $Gb_{128}(n) = B_7(128-n)$ when the procedure of Equation 2 uses $D_k = [1\ 8\ 2\ 4\ 16\ 32\ 64]$ (k=1, 2, ..., 7) and $W_k = [-1\ -1\ -1\ -1\ +1\ -1\ -1]$.

For example, $Ga_{64}(n) = A_6(64-n)$, $Gb_{64}(n) = B_6(64-n)$ when the procedure of Equation 2 uses $D_k = [2\ 1\ 4\ 8\ 16\ 32]$ and $W_k = [1\ 1\ 1\ -1\ -1\ 1\ -1]$.

For example, $Ga_{32}(n) = A_5(32-n)$, $Gb_{32}(n) = B_5(32-n)$ when the procedure of Equation 2 uses $D_k = [1\ 4\ 8\ 2\ 16]$ and $W_k = [-1\ 1\ -1\ 1\ -1]$.

Meanwhile, an L-CEF 920 of the legacy preamble of FIG. 10 is configured such that a $Gu_{512}(n)$ sequence and $Gv_{512}(n)$ sequence having a length of 512 and a $Gv_{128}(n)$ sequence are consecutive.

Figure 11:
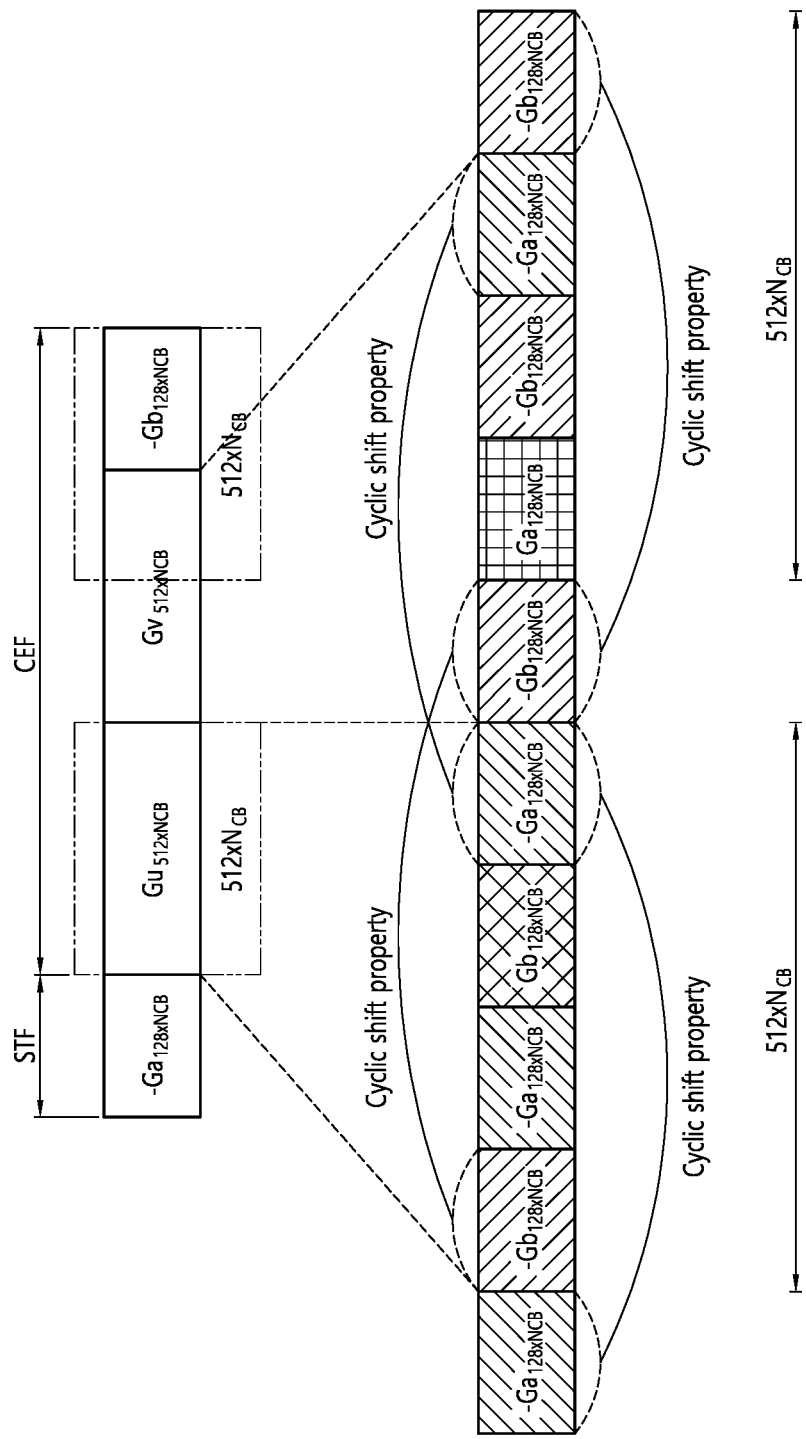
FIG. 11 is an exemplary diagram showing an EDMG preamble.

FIG. 11 is an exemplary diagram showing an EDMG preamble.

Referring to FIG. 9 to FIG. 11, an EDMG-CEF (e.g., 960) of the EDMG preamble of FIG. 11 is configured such that a $GU_{512 \times NCB}(n)$ sequence having a length of $512 \times N_{CB}$, a $GV_{512 \times NCB}(n)$ sequence having a length of $512 \times N_{CB}$, and a $-Gb_{128 \times NCB}(n)$ sequence having a length of $128 \times N_{CB}$ are consecutive.

In the present specification, $N_{CB}$ (or NCB) denotes a channel bonding factor, and may be understood as the number of channels used for channel bonding.

For example, the $Gu_{512 \times NCB}(n)$ sequence may include a $-Gb_{128 \times NCB}(n)$ sub-sequence, a $-Ga_{128 \times NCB}(n)$ sub-sequence, a $Gb_{128 \times NCB}(n)$ sub-sequence, and a $-Ga_{128 \times NCB}(n)$ sub-sequence.

For example, the $Gv_{512 \times NCB}(n)$ sequence may include a $-Gb_{128 \times NCB}(n)$ sub-sequence, a $Ga_{128 \times NCB}(n)$ sub-sequence, a $-Gb_{128 \times NCB}(n)$ sub-sequence, and a $-Ga_{128 \times NCB}(n)$ sub-sequence.

As shown in FIG. 11, it will be understood that a cyclic shift property can be satisfied between sub-sequences included in the EDMG-CEF (e.g., 960).

Figure 12:
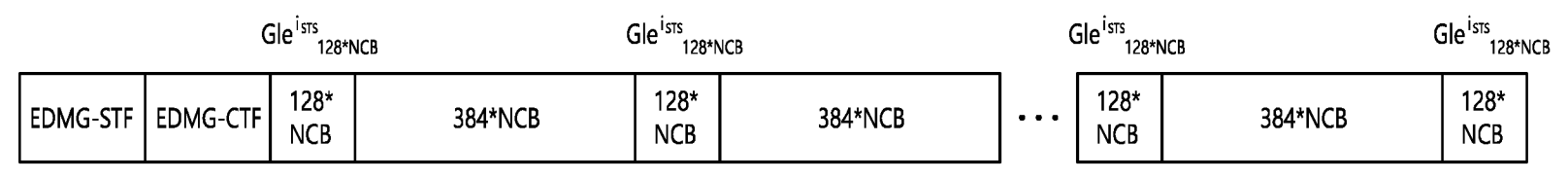
Figure 13:
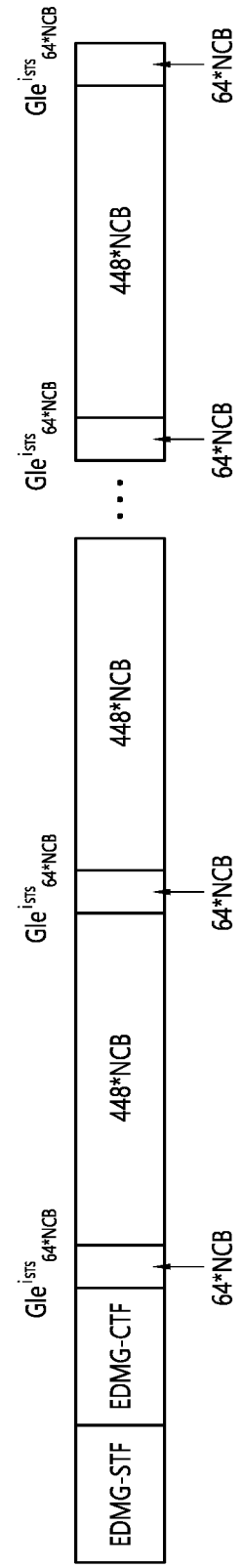
Figure 14:
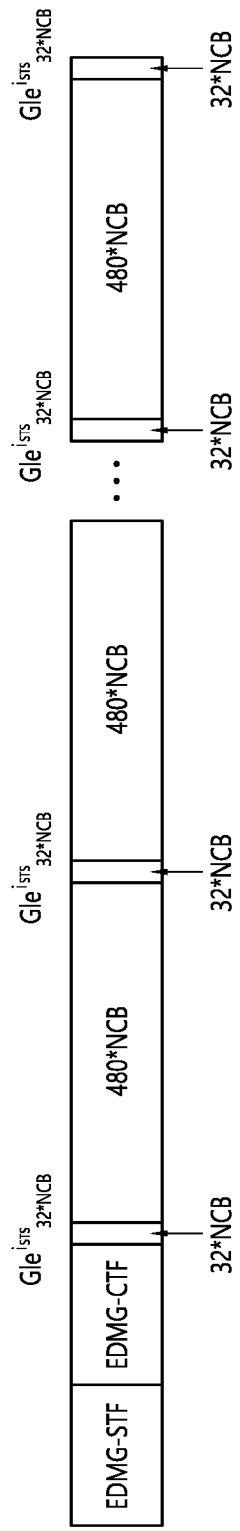

FIG. 12 to FIG. 14 show a data field included in a PPDU based on a GI in an SC mode.

Hereinafter, the present specification is described under the premise that a single carrier (SC) mode is applied among a plurality of modes for the IEEE 802.11ay for a wireless device.

Referring to FIG. 12 to FIG. 24, when the SC mode is applied, the data field included in the PPDU may include a plurality of data tone sets and a plurality of guard intervals (hereinafter, GIs) inserted between the plurality of data tone sets.

Referring to FIG. 12, when a long GI is applied to the data field in the SC mode, the long GI may include a $GIe^{i_{STS}}_{128 \times NCB}$ sequence having a length of $128 \times NCB$. Herein, $i_{STS}$ denotes an index of a spatial stream associated with the PPDU.

Referring to FIG. 13, when a normal GI is applied in the SC mode, the normal GI may include a $GIe^{i_{STS}}_{64 \times NCB}$ sequence having a length of $64 \times NCB$.

Referring to FIG. 14, when a short GI is applied in the SC mode, the short GI may include a $GIe^{i_{STS}}_{32 \times NCB}$ sequence having a length of $32 \times NCB$.

For clear and simple description of FIG. 12 to FIG. 14, it is premised that $N_{CB}$ is less than 2 and $i_{STS}$ is less than 2. In the present specification, the long GI, the normal GI, and the short GI may be as shown in Table 1 to Table 2 below.

TABLE 1

| Space-time stream number ($i_{STS}$) | Short GI | Normal GI | Long GI |
| --- | --- | --- | --- |
| 1 | $GIe^1/_{32} = -GA^1/_{32}$ | $GIe^1/_{64} = +Ga^1/_{64}$ | $GIe^1/_{128} = -GA^1/_{128}$ |
| 2 | $GIe^2/_{32} = -GA^2/_{32}$ | $GIe^2/_{64} = +Ga^2/_{64}$ | $GIe^2/_{128} = -^2/_{128}$ |

TABLE 2

| Space-time stream number ($i_{STS}$) | Short GI | Normal GI | Long GI |
| --- | --- | --- | --- |
| 1 | $GIe^1/_{64} = -GA^1/_{64}$ | $GIe^1/_{128} = +Ga^1/_{128}$ | $GIe^1/_{256} = +Ga^1/_{256}$ |
| 2 | $GIe^2/_{64} = -GA^2/_{64}$ | $GIe^2/_{128} = +Ga^2/_{128}$ | $GIe^2/_{256} = +Ga^2/_{256}$ |

However, Table 1 or Table 2 above is one example only, and it will be understood that the present specification is not limited thereto.

Meanwhile, the Golay sequence used in the EDMG preamble may be generated based on Equations 3 and 4 and Tables 3 and 4 below.

$$Ga_N^i(n) = A_k^i(N-n)$$

$$Gb_N^i(n) = B_k^i(N-n)$$

$$Gc_N^i(n) = A_k^i(N-n)$$

$$Gd_N^i(n) = B_k^i(N-n) \quad \text{[Equation 3]}$$

$$A_o^i(n) = \delta(n)$$

$$B_o^i(n) = \delta(n)$$

$$A_k^i(n) = W_k^i A_{k-1}^i(n) + B_{k-1}^i(n-D_k)$$

$$B_k^i(n) = W_k^i A_{k-1}^i(n) - B_{k-1}^i(n-D_k)$$

$$N = 2^k \quad \text{[Equation 4]}$$

TABLE 3

| Space-time stream/ transmit chain number | $W_k^i$ for $Gc_{32}^i$ and $Gd_{32}^i$ | $W_k^i$ for $Ga_{64}^i$ and $Gb_{64}^i$ | $W_k^i$ for $Gc_{64}^i$ and $Gd_{64}^i$ | $W_k^i$ for $Ga_{128}^i$ and $Gb_{128}^i$ | $W_k^i$ for $Gc_{128}^i$ and $Gd_{128}^i$ |
|---|---|---|---|---|---|
| 1 | [+1,+1,−1,−1,+1] | [+1,+1,−1,−1,+1,−1] | [−1,−1,−1,−1,+1,−1] | [−1,−1,−1,−1,+1,−1,−1] | [+1,+1,−1,−1,+1,+1,+1] |
| 2 | [−1,+1,−1,−1,+1] | [+1,+1,−1,−1,+1,−1] | [+1,−1,−1,−1,+1,−1] | [+1,−1,−1,−1,+1,−1,−1] | [−1,+1,−1,−1,+1,+1,+1] |

TABLE 4

| Space-time stream/ transmit chain number | $W_k^i$ for $Ga_{256}^i$ and $Gb_{256}^i$ |
|---|---|
| 1 | [−1,−1,−1,−1,+1,−1,−1,+1] |
| 2 | [+1,−1,−1,−1,+1,−1,−1,+1] |

Referring to Equations 3 and 4 and Tables 3 and 4 above, $D_k=[1\ 4\ 8\ 2\ 16]$ may be used for $Ga^i_{32}$ and $Gb^i_{32}$. In addition, $D_k=[2\ 1\ 4\ 8\ 16]$ may be used for $Gc^i_{32}$ and $Gd^i_{32}$.

For example, $D_k=[2\ 1\ 4\ 8\ 16\ 32]$ may be used for $Ga^i_{64}$ and $Gb^i_{64}$. In addition, $D_k=[1\ 8\ 2\ 4\ 16\ 32]$ may be used for $Gc^i_{64}$ and $Gd^i_{64}$.

For example, $D_k=[1\ 8\ 2\ 4\ 16\ 32\ 64]$ may be used for $Ga^i_{128}$ and $Gb^i_{128}$. In addition, $D_k=[2\ 1\ 4\ 8\ 16\ 21\ 64]$ may be used for $Gc^i_{128}$ and $Gd^i_{128}$.

For example, $D_k=[1\ 8\ 2\ 4\ 16\ 21\ 64\ 128]$ may be used for $Ga^i_{256}$ and $Gb^i_{256}$.

Figure 15:
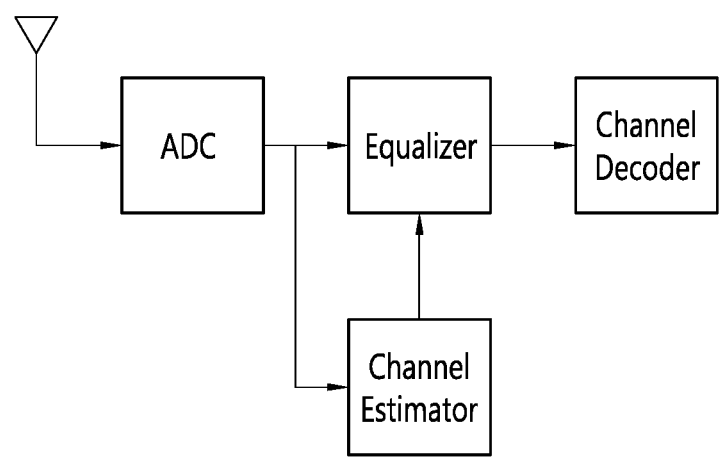
FIG. 15 is a block diagram showing a receiving end of a general communication system.

FIG. 15 is a block diagram showing a receiving end of a general communication system.

Referring to FIG. 1 to FIG. 15, similarly to the general communication system, WiGig may also require channel estimation to demodulate a data field.

For example, the channel estimation may be performed based on an L-CEF (e.g., 920 of FIG. 9) included in pre-EDMG modulated fields (e.g., 910 to 940 of FIG. 9) and an EDMG-CEF (e.g., 960 of FIG. 9) included in EDMG modulated fields (e.g., 950 to 990 of FIG. 9).

In case of a receiving end without a channel tracker as shown in FIG. 15, when a channel state changes over time after the channel estimation, if data is demodulated based on a initially estimated channel, performance of the receiving end may deteriorate.

Figure 16:
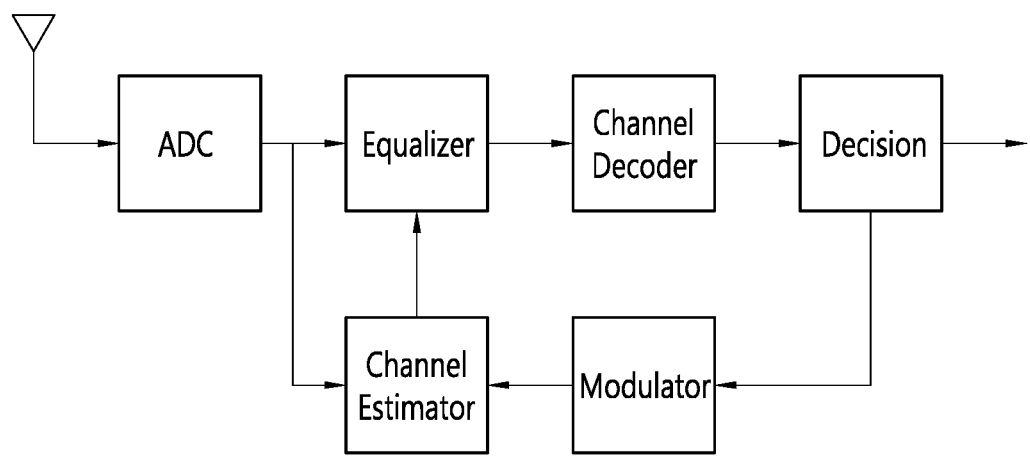
FIG. 16 is a block diagram showing a receiving end of a communication system to describe a decision feedback equalizer (DFE).

FIG. 16 is a block diagram showing a receiving end of a communication system to describe a decision feedback equalizer (DFE).

Referring to FIG. 1 to FIG. 16, when the DFE is used in a general system, complexity of the receiving end may increase since it is necessary to estimate a channel via a channel decoder and by performing demodulation again.

Figure 17:
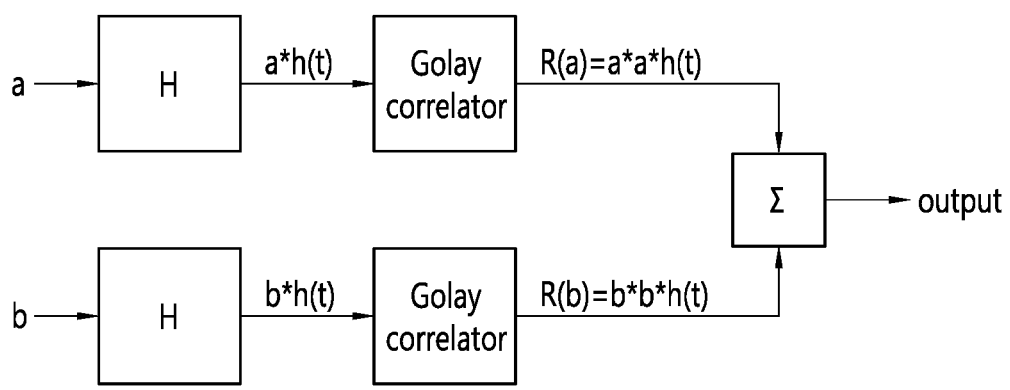
FIG. 17 is a block diagram for a channel estimation method using a characteristic of the conventional Golay sequence.

FIG. 17 is a block diagram for a channel estimation method using a characteristic of the conventional Golay sequence. Referring to FIG. 1 to FIG. 17, an output of FIG. 17 will be understood based on Equation 5 below.

$$\text{output} = R(a) + R(b) = a * a * h(t) + b * b * h(t) = \quad \text{[Equation 5]}$$
$$(a * a + b * b) * h(t) = \delta(t) * h(t) = h(t)$$

Figure 18:
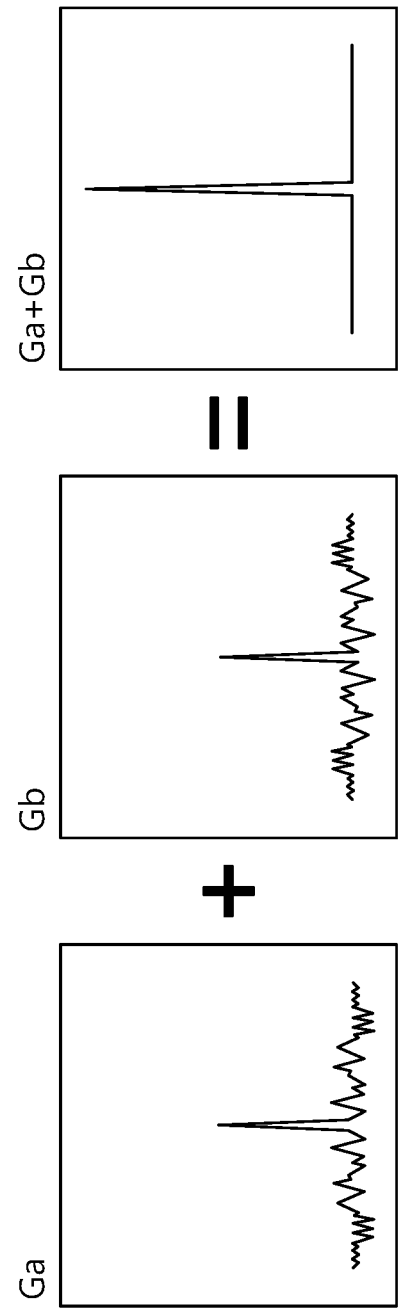
FIG. 18 shows the concept of a channel estimation method using a characteristic of the conventional Golay sequence.

FIG. 18 shows the concept of a channel estimation method using a characteristic of the conventional Golay sequence.

Ga of FIG. 18 may correspond to $R(a)=a*a*h(t)$ of FIG. 18, and Gb of FIG. 18 may correspond to $R(a)=b*b*h(t)$ of FIG. 18. In addition, Ga+Gb of FIG. 18 may correspond to the output of Equation 5 described with reference to FIG. 17.

The following modeling for a residual channel according to a channel change in a SISO case and a MIMO case will be described in the present specification described below.

1. Modeling for Residual Channel in SISO Case

A signal y(n) received in a receiving end through a wireless channel h(n), which is an IEEE 802.11ay-based radio signal to be transmitted from an AP or a PCP to an STA (or in an opposite direction), may be expressed by Equation 6 below.

$$y(n) = h(n) * (x(n) + g(n)) \quad \text{[Equation 6]}$$

In Equation 6 above, h(n) may be associated with a response for a wireless channel in a time domain, x(n) may be associated with a data part of a transmit (Tx) signal, and g(n) may be associated with a GI part of the Tx signal. Meanwhile, x(n) and g(n) of Equation 6 may be expressed by Equations 7 and 8 below.

$$x(n) = \begin{cases} x_{N-N_{GI}}(n) & n = 0, 1, \ldots, N - N_{GI} - 1 \\ 0 & n = N - N_{GI}, \ldots, N - 1 \end{cases} \quad \text{[Equation 7]}$$

$$g(n) = \begin{cases} 0 & n = 0, 1, \ldots, N - N_{GI} - 1 \\ g_{N_{GI}}(n) & n = N - N_{GI}, \ldots, N - 1 \end{cases} \quad \text{[Equation 8]}$$

In Equation 7 above, N is associated with a length of the SC block, and $N_{GI}$ is associated with a length of the GI part.

Meanwhile, a change of a channel after channel estimation may be modeled in a frequency domain as expressed by Equation 9 below.

$$H(k) = \hat{H}_{Init}(k) H_{Residual}(k) \quad \text{[Equation 9]}$$

Referring to Equation 9 above, H(k), $\hat{H}_{Init}$(k), and $H_{Residual}$(k) denote frequency responses of a channel experienced by a receive (Rx) signal, an initial channel estimation value, and a channel change level after a specific time elapses, respectively.

In addition, when Equation 6 is applied with FFT and is then substituted to Equation 9, an output signal y(n) may be expressed by Equation 10 below.

$$Y(k) = H(k)(X(k) + G(k)) = \quad \text{[Equation 10]}$$
$$(\hat{H}_{Init}(k) H_{Residual}(k)) X(k) + (\hat{H}_{Init}(k) H_{Residual}(k)) G(k)$$

Referring to Equation 10 above, X(k) corresponds to the data part in the frequency domain, and G(k) corresponds to the GI part.

Meanwhile, a time-domain signal subjected to equalization in the frequency domain may be expressed by Equation 11 below.

$$(\hat{x}(n) + \hat{g}(n)) = \quad \text{[Equation 11]}$$
$$IFFT\left(\frac{\hat{H}^*_{Init}(k)}{|\hat{H}_{Init}(k)|^2} Y(k)\right) = h_{Residual}(n) * (x(n) + g(n))$$

Eventually, through Equation 11 above, it can be seen that, when $h_{Residual}$(n) is estimated in the SISO case, channel estimation can be accurately performed while reflecting a change level for the channel.

2. Modeling for Residual Channel in MIMO Case

When there are two Tx antennas and two Rx antennas (i.e., 2×2 MIMO case), a signal $y_i$(n) received in a receiving end through a wireless channel $h_{ij}$(n), which is an IEEE 802.11ay-based radio signal to be transmitted from an AP or a PCP to an STA (or in an opposite direction), may be expressed by Equation 12 below.

$$\begin{bmatrix} Y_0(k) \\ Y_1(k) \end{bmatrix} = \underbrace{\begin{bmatrix} H_{00}(k) & H_{01}(k) \\ H_{10}(k) & H_{11}(k) \end{bmatrix}}_{H} \underbrace{\begin{bmatrix} X_0(k) \\ X_1(k) \end{bmatrix}}_{x} + \quad \text{[Equation 12]}$$
$$\underbrace{\begin{bmatrix} H_{00}(k) & H_{01}(k) \\ H_{10}(k) & H_{11}(k) \end{bmatrix}}_{H} \underbrace{\begin{bmatrix} G_0(k) \\ G_1(k) \end{bmatrix}}_{g} + \begin{bmatrix} n_0(k) \\ n_1(k) \end{bmatrix}$$

In this case, a channel change depending on a time change after channel estimation may be modeled in a frequency domain as expressed by Equation 13 below.

$$\underbrace{\begin{bmatrix} H_{00}(k) & H_{01}(k) \\ H_{10}(k) & H_{11}(k) \end{bmatrix}}_{H} = \quad \text{[Equation 13]}$$
$$\underbrace{\begin{bmatrix} \hat{H}_{00,Init}(k) & \hat{H}_{01,Init}(k) \\ \hat{H}_{10,Init}(k) & \hat{H}_{11,Init}(k) \end{bmatrix}}_{\hat{H}_{Init}} \underbrace{\begin{bmatrix} H_{00,Residual}(k) & H_{01,Residual}(k) \\ H_{10,Residual}(k) & H_{11,Residual}(k) \end{bmatrix}}_{H_{Residual}}$$

Meanwhile, when Equation 12 is expressed in a matrix form, Equation 14 below may be obtained by substituting Equation 12 having the matrix form to Equation 13.

$$y = Hx + Hg \quad \text{[Equation 14]}$$
$$= (\hat{H}_{Init} H_{Residual})(x + g)$$

In addition, Equation 15 below expresses a case where MIMO decoding is performed for Equation 14.

$$Wy = W(\hat{H}_{Init} H_{Residual})(x + g) \quad \text{[Equation 15]}$$
$$= H_{Residual}(x + g)$$

When Equation 15 is applied with FFT and is then expressed in a time domain, Equation 16 below may be obtained similarly to the SISO case.

$$(\hat{x}_0(n) + \hat{g}_0(n)) = h_{00,Residual}(n) * (x_0(n) + g_0(n)) = h_{01,Residual}(n) * (x_1(n) + g_1(n))$$

$$(\hat{x}_1(n) + \hat{g}_1(n)) = h_{10,Residual}(n) * (x_0(n) + g_0(n)) = h_{11,Residual}(n) * (x_1(n) + g_1(n)) \quad \text{[Equation 16]}$$

After equalization expressed in Equation 11 or Equation 16 above, it may be assumed that a time-domain signal has a very short channel delay profile of a residual channel due to the equalization. Accordingly, in one present embodiment, a channel may be estimated by using a GI.

Figure 19:
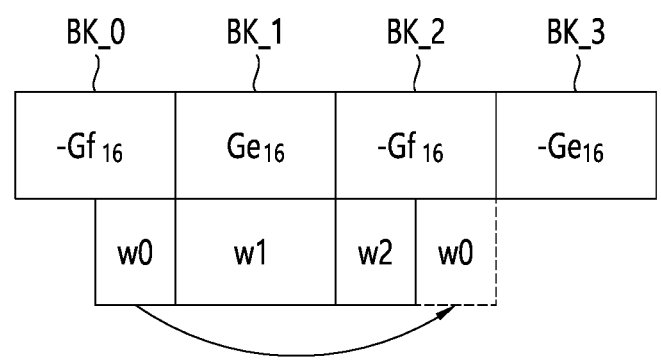
FIG. 19 shows a process of generating a signal used for channel tracking according to one present embodiment.

FIG. 19 shows a process of generating a signal used for channel tracking according to one present embodiment.

3. Method of Estimating Residual Channel

According to the present specification, a Golay sequence included in a GI used in an SC mode of IEEE 802.11ad or IEEE 802.11ay may be expressed based on Equations 17 to 22 and Tables 5 and 6 below.

For example, if $N_{CB}$ is '1', a short GI may be expressed by Equation 17 below.

$$Ga^i_{128}(n) = [\ Gd^i_{64}(n)\ -Gc^i_{64}(n)\ ] = \quad \text{[Equation 17]}$$
$$[\ -Gf^i_{32}(n)\ -Ge^i_{32}(n)\ -Gf^i_{32}(n)\ Ge^i_{32}(n)\ ]$$

For example, if $N_{CB}$ is '1', a normal GI may be expressed by Equation 18 below.

$$Ga^i_{64}(n) = [\ Gd^i_{32}(n)\ -Gc^i_{32}(n)\ ] = \quad \text{[Equation 18]}$$
$$[\ -Gd^i_{16}(n)\ Gc^i_{16}(n)\ -Gd^i_{16}(n)\ -Gc^i_{16}(n)\ ]$$

For example, if $N_{CB}$ is '1', a long GI may be expressed by Equation 19 below.

$$Gc^i_{128}(n) = [\ -Ga^i_{64}(n)\ -Gb^i_{64}(n)\ ] = \quad \text{[Equation 19]}$$
$$[\ -Gd^i_{32}(n)\ Gc^i_{32}(n)\ Gd^i_{32}(n)\ Gc^i_{32}(n)\ ]$$

For example, if $N_{CB}$ is '2', the short GI may be expressed by Equation 20 below.

$$Gc_{64}^i(n) = [\, Gf_{32}^i(n) \quad -Ge_{32}^i(n)\,] = \quad\quad \text{[Equation 20]}$$
$$[\,-Gf_{16}^i(n) \quad Ge_{16}^i(n) \quad -Gf_{16}^i(n) \quad -Ge_{16}^i(n)\,]$$

For example, if $N_{CB}$ is '2', the normal GI may be expressed by Equation 21 below.

$$Ga_{128}^i(n) = [\, Gd_{64}^i(n) \quad -Gc_{64}^i(n)\,] = \quad\quad \text{[Equation 21]}$$
$$[\,-Gf_{32}^i(n) \quad -Ge_{32}^i(n) \quad -Gf_{32}^i(n) \quad Ge_{32}^i(n)\,]$$

For example, if $N_{CB}$ is '2', the long GI may be expressed by Equation 22 below.

$$Ga_{256}^i(n) = [\, Gb_{128}^i(n) \quad Ga_{128}^i(n)\,] = \quad\quad \text{[Equation 22]}$$
$$[\,-Gd_{64}^i(n) \quad -Gc_{64}^i(n) \quad Gd_{64}^i(n) \quad -Gc_{64}^i(n)\,]$$

TABLE 5

| Space-time stream/ transmit chain number | $W_k^i$ for $Gc_{16}^i$ and $Gd_{16}^i$ | $W_k^i$ for $Gc_8^i$ and $Gd_8^i$ |
|---|---|---|
| 1 | [+1,+1,−1,−1] | [−1,+1,−1,−1] |
| 2 | [−1,+1,−1,−1] | [−1,+1,−1] |

TABLE 6

| Space-time stream/ transmit chain number | $W_k^i$ for $Ge_{32}^i$ and $Gf_{32}^i$ | $W_k^i$ for $Ge_{16}^i$ and $Gf_{16}^i$ |
|---|---|---|
| 1 | [−1,−1,−1,−1,+1] | [−1,−1,−1,−1] |
| 2 | [+1,−1,−1,−1,+1] | [+1,−1,−1,−1] |

Referring to Equations 17 to 22 and Tables 5 and 6 above, $D_k$=[2 1 4 8] may be used for $Gc_{16}^i$ and $Gd_{16}^i$. In addition, $D_k$=[2 1 4] may be used for $Gc_8^i$ and $Gd_8^i$.

For example, $D_k$=[1 8 2 4 1 6] may be used for $Ge_{32}^i$ and $Gf_{32}^i$. In addition, $D_k$=[1 8 2 4] may be used for $Ge_{16}^i$ and $Gf_{16}^i$.

Although the Golay sequence included in the GI used in the SC mode is mentioned only in part in the standard document, it will be understood that the present specification is not limited thereto.

For clear and simple understanding of one present embodiment, it may be premised that $N_{CB}$=2 and the short GI is applied.

Referring to FIG. 19, 64 samples based on the short GI of Equation 20 may be divided into four blocks BK_0 to BK_3.

For example, the first block BK_0 may correspond to $-Gf_{16}$, and the second block BK_1 may correspond to $Ge_{16}$. In addition, the third block BK_2 may correspond to $-Gf_{16}$, and the fourth block BK_3 may correspond to $-Ge_{16}$.

According to one present embodiment, three blocks (e.g., BK_0 to BK_2) having the same sequence and located before and after one block (e.g., BK_1) may be selected.

According to one present embodiment, a sequence w0 associated with a rear part of the first block (e.g., BK_0), a sequence w1 associated with the second block (e.g., BK_1), and a sequence w2 associated with a front part of the third block (e.g., BK_2) may be defined.

In order to configure a signal used for channel tracking according to one present embodiment, the sequence w0 associated with the rear part of the first block (e.g., BK_0) may be moved to a rear part of the sequence w2 associated with the front part of the third block (e.g., BK_2).

According to one present embodiment, a new signal of FIG. 19 may be used by considering inter-symbol interference (ISI) of the data part.

Figure 20:
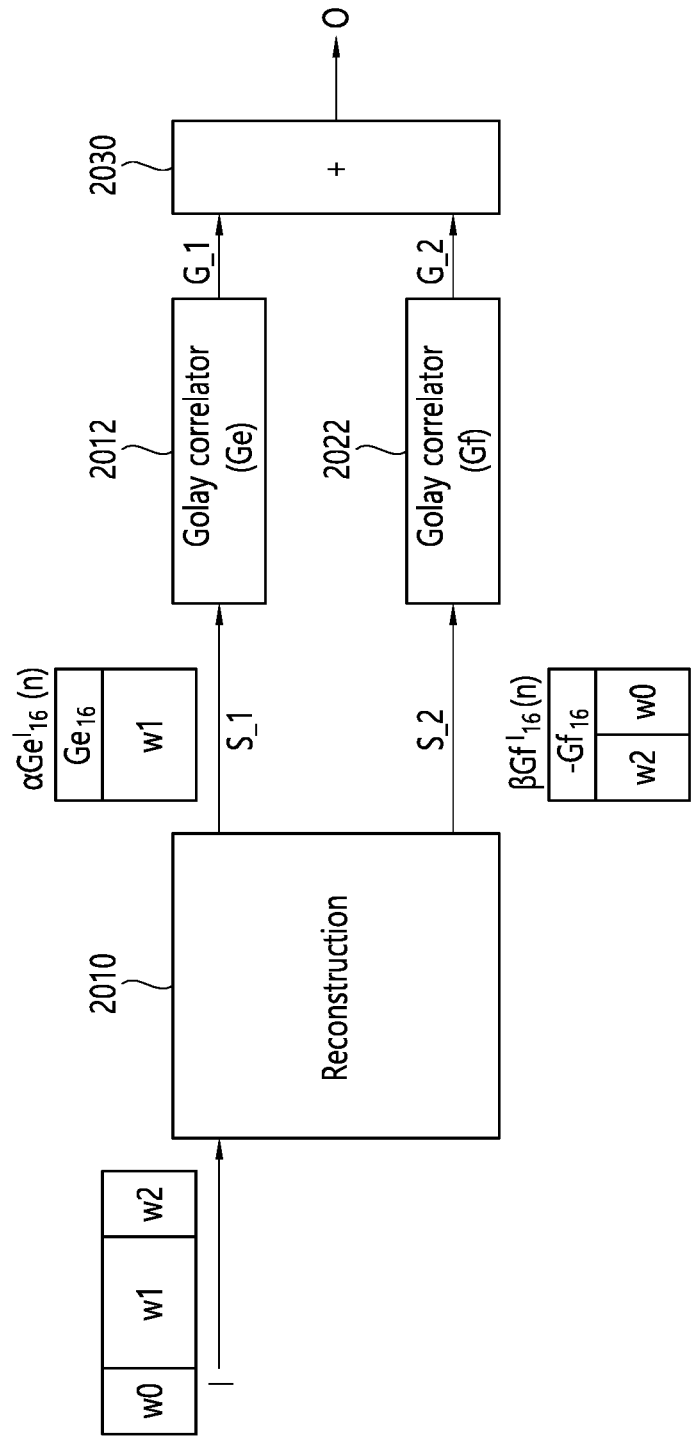
FIG. 20 shows a block diagram for generating a signal used for channel tracking according to one present embodiment.

FIG. 20 shows a block diagram for generating a signal used for channel tracking according to one present embodiment.

Referring to FIG. 1 to FIG. 20, an input signal I of a reconstruction block 2010 of FIG. 20 may be a signal used for channel tracking according to one present embodiment described above with reference to FIG. 19.

The reconstruction block 2010 may generate a first sequence S1 and second sequence S2 generated based on the input signal I.

For example, the first sequence S1 may correspond to the sequence w1 associated with $Ge_{16}$ of the second block BK_1 of FIG. 19. Herein, the first sequence S1 may be expressed by $\alpha Ge^1_{16}(n)$.

In addition, the second sequence S2 may correspond to the sequences w2 and w0 associated with $-Ge_{16}$ of the third block BK_2 of FIG. 19. Herein, the second sequence S2 may be expressed by $\beta Gf^1_{16}(n)$.

A first Golay correlator 2021 may output a first Golay sequence G_1, based on the first sequence S_1.

A second Golay correlator 2022 may output a second Golay sequence G_2, based on the second sequence S_2.

A summation block 2030 may generate an output signal O, based on the first sequence S_1 and the second sequence S_2.

Figure 21:
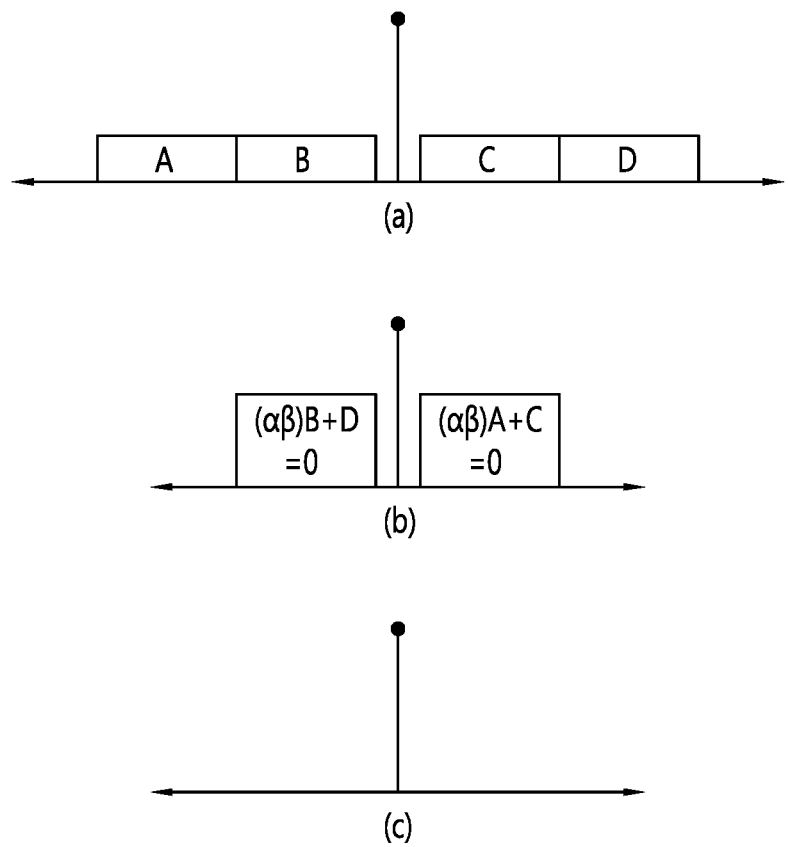
FIG. 21 shows the concept of a process of performing channel tracking, based on a signal used for channel tracking, according to one present embodiment.

FIG. 21 shows the concept of a process of performing channel tracking, based on a signal used for channel tracking, according to one present embodiment.

Referring to FIG. 21(a), FIG. 21(a) may correspond to the output signal O of FIG. 20. FIG. 21(a) shows an impulse signal and residual signals A, B, C, and D expressed as four parts.

For example, when the parts A and B of FIG. 21(a) are multiplied by αβ and added as shown in FIG. 21(b), only the impulse signal remains as shown in FIG. 21(c).

Herein, α may be associated with a sign of the first sequence S_1 input to the first Golay correlator 2021, and β may be associated with a sign of the second sequence S_2 input to the second Golay correlator 2022.

A wireless AV (WAV) system mentioned in the present specification may include a set-top device (i.e., a main body) and a panel device. In general, positions of the set-top device and the OLED panel are fixed in the WAV system. Accordingly, a wireless channel of the WAV system has a characteristic of a static channel.

Figure 22:
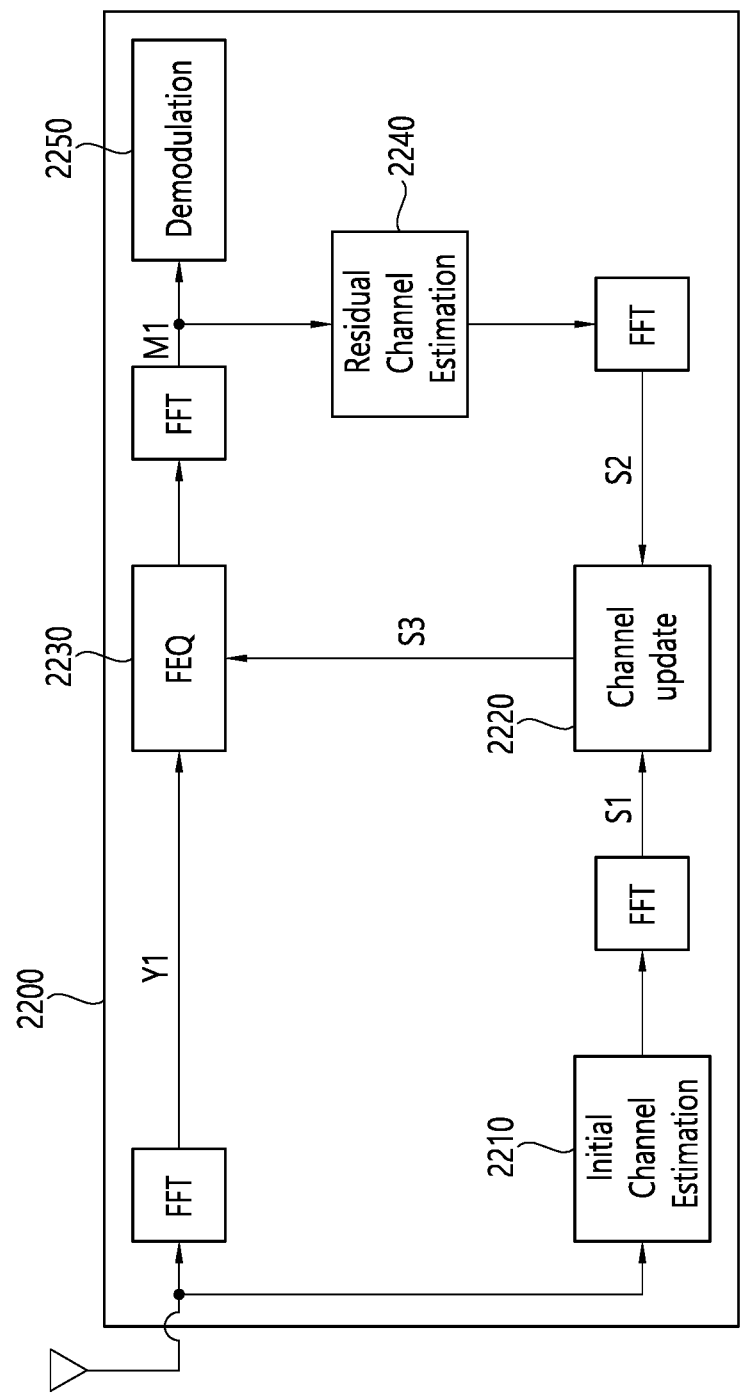
FIG. 22 shows a block diagram of a wireless device which performs channel tracking in a wireless AV system according to one present embodiment.

FIG. 22 shows a block diagram of a wireless device which performs channel tracking in a wireless AV system according to one present embodiment.

Referring to FIG. 1 to FIG. 22, a wireless device 2200 may include an initial channel estimator 2210, a channel update unit 2220, a frequency domain equalizer (FEQ) unit 2230, a residual channel estimation unit 2240, and a demodulation unit 2250.

The initial channel estimator 2210 may perform initial channel estimation, based on an L-CEF (e.g., 920 of FIG. 9) or initial EDMG-CEF (e.g., 960 of FIG. 9) of an Rx signal (i.e., PPDU) received in the wireless device 2200. For example, a first signal S1 may be associated with a result based on the initial channel estimation performed based on the L-CEF (e.g., 920 of FIG. 9) and the initial EDMG CEF (e.g., 960 of FIG. 9).

The channel update unit 2220 may update a channel, based on the first signal S1 obtained by converting an output signal of the initial channel estimator 2210 into a frequency domain and a second signal S2 obtained by converting an output signal of the residual channel estimation unit 2240 into the frequency domain. For example, a third signal S3 may be associated with the updated channel.

The FEQ unit 2230 may perform channel compensation, based on an Rx signal Y1 converted into the frequency domain and the third signal S3 which is an output of the channel update unit 2220.

The residual channel estimation unit 2240 may estimate a residual channel, based on a signal M1 obtained by converting the output signal of the FEQ unit 2230 into the frequency domain. The process of estimating the residual channel may be understood based on the content described above with reference to FIG. 19 to FIG. 21. For example, the second signal S1 may be associated with a result obtained by estimating the residual channel.

The demodulation unit 2250 may demodulate the signal M obtained by converting the output signal of the FEQ unit 2230 into the frequency domain.

Figure 23:
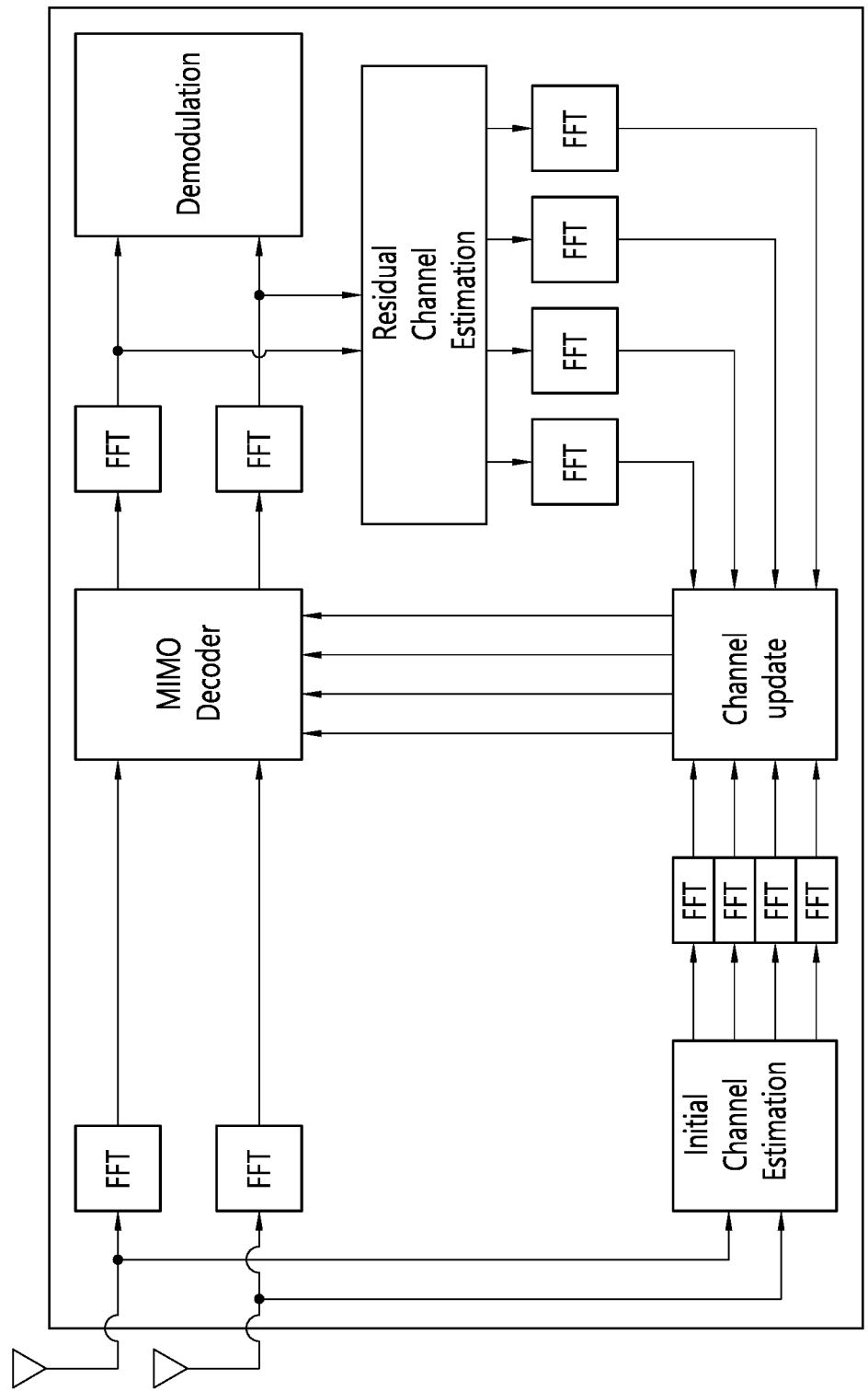
FIG. 23 shows a block diagram of a wireless device which performs channel tracking in a wireless AV system according to another present embodiment.

FIG. 23 shows a block diagram of a wireless device which performs channel tracking in a wireless AV system according to another present embodiment. FIG. 23 corresponds to a 2×2 MIMO case, as an extended example of FIG. 22 which is a SISO case.

When the wireless AV system according to the present specification uses a wireless device which performs channel tracking, based on the GI, improvement can be expected in terms of a computation amount and performance of a receiving end while decreasing complexity of the receiving end.

Figure 24:
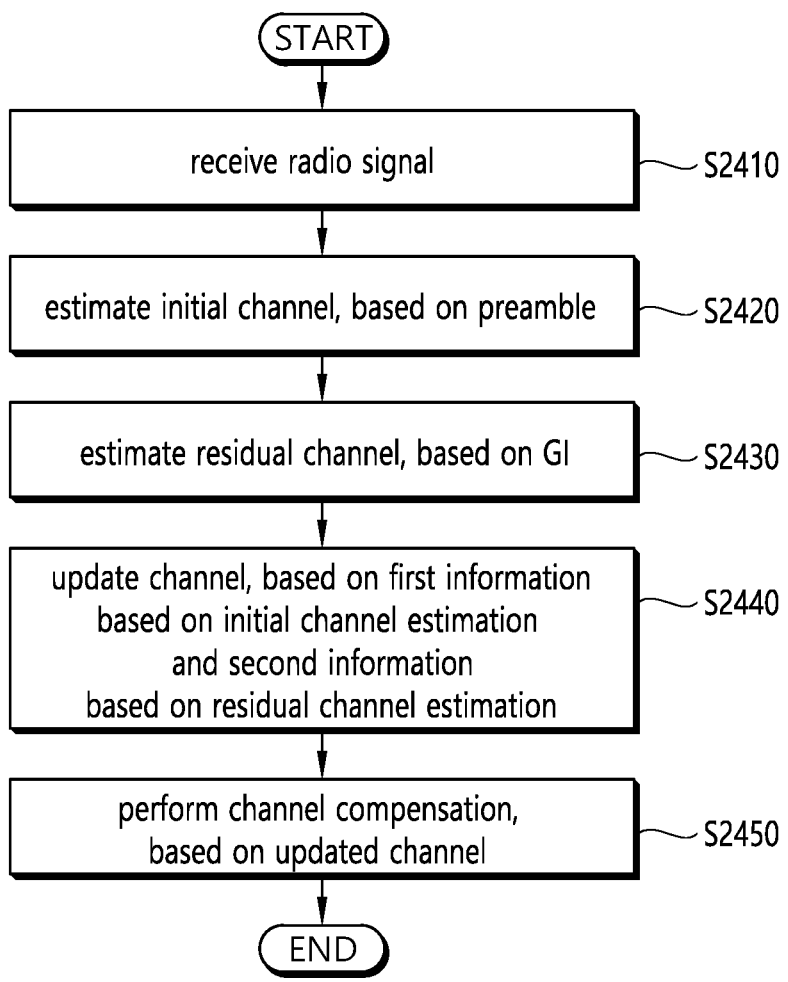
FIG. 24 shows a flowchart for performing channel tracking in a wireless AV system according to one present embodiment.

FIG. 24 shows a flowchart for performing channel tracking in a wireless AV system according to one present embodiment.

Referring to FIG. 1 to FIG. 24, in step S2410, a first wireless device may receive from a second wireless device a radio signal (e.g., 900 of FIG. 9) including a first part associated with a preamble and a second part associated with a data block and a guard interval (GI).

For example, the radio signal may be a signal based on a single carrier (SC) mode.

A case where the number of channels used for channel bonding in a wireless AV system is '1' is described. For example, upon applying a short GI to the GI, the GI may include a Golay sequence having a length of 32. For example, upon applying a normal GI to the GI, the GI may include a Golay sequence having a length of 64. For example, upon applying a long GI to the GI, the GI may include a Golay sequence having a length of 128.

Meanwhile, a case where the number of channels used for channel bonding in the wireless AV system is '2' is described. For example, upon applying the short GI to the GI, the GI may include a Golay sequence having a length of 64. For example, upon applying the normal GI to the GI, the GI may include a Golay sequence having a length of 128. For example, upon applying the long GI to the GI, the GI may include a Golay sequence having a length of 256.

For example, when the number of channels used for channel bonding in the wireless AV system is '2' and when the short GI is applied to the GI, the short GI may be defined based on a structure of [A B C D]. For example, [A B C D] may correspond to $[-Gf_{16}\ Ge_{16}-Gf_{16}-Ge_{16}]$.

For example, if A is associated with $1^{st}$ to $16^{th}$ sequences, $9^{th}$ to $16^{th}$ sequences are defined as w0. In addition, if B is associated with $17^{th}$ to $32^{nd}$ sequences, the 17th to $32^{nd}$ sequences are defined as w1.

For example, if C is associated with $33^{rd}$ to $48^{th}$ sequences, the $33^{rd}$ to $40^{th}$ sequences are defined as w2. In addition, D is associated with $49^{th}$ to $64^{th}$ sequences.

In step S2420, the first wireless device may estimate an initial channel, based on a preamble. For example, the initial channel estimation may be performed based on an L-CEF or EDMG-CEF included in a preamble of a received radio signal (e.g., 900 of FIG. 9).

In step S2430, the first wireless device may estimate a residual channel, based on a GI. In this case, a reconstruction sequence reconstructed based on a Golay sequence having a predetermined length may be applied to the GI.

For example, the reconstruction sequence may be a signal in which w1, w2, and w0 are sequentially included. It may be understood that the reconstruction sequence according to one present embodiment is designed by considering ISI of a data part.

In step S2440, the first wireless device may update a channel, based on first information obtained based on the estimation of the initial channel and second information obtained based on the estimation of the residual channel.

For example, the second information may be obtained based on the product of a sign of B (e.g., α of FIG. 21) and a sign of C (e.g., β in FIG. 21) of [A B C D]. For example, the second information may be obtained through the aforementioned process of FIG. 21.

In step S2450, the first wireless device may perform channel compensation, based on the updated channel.

Figure 25:
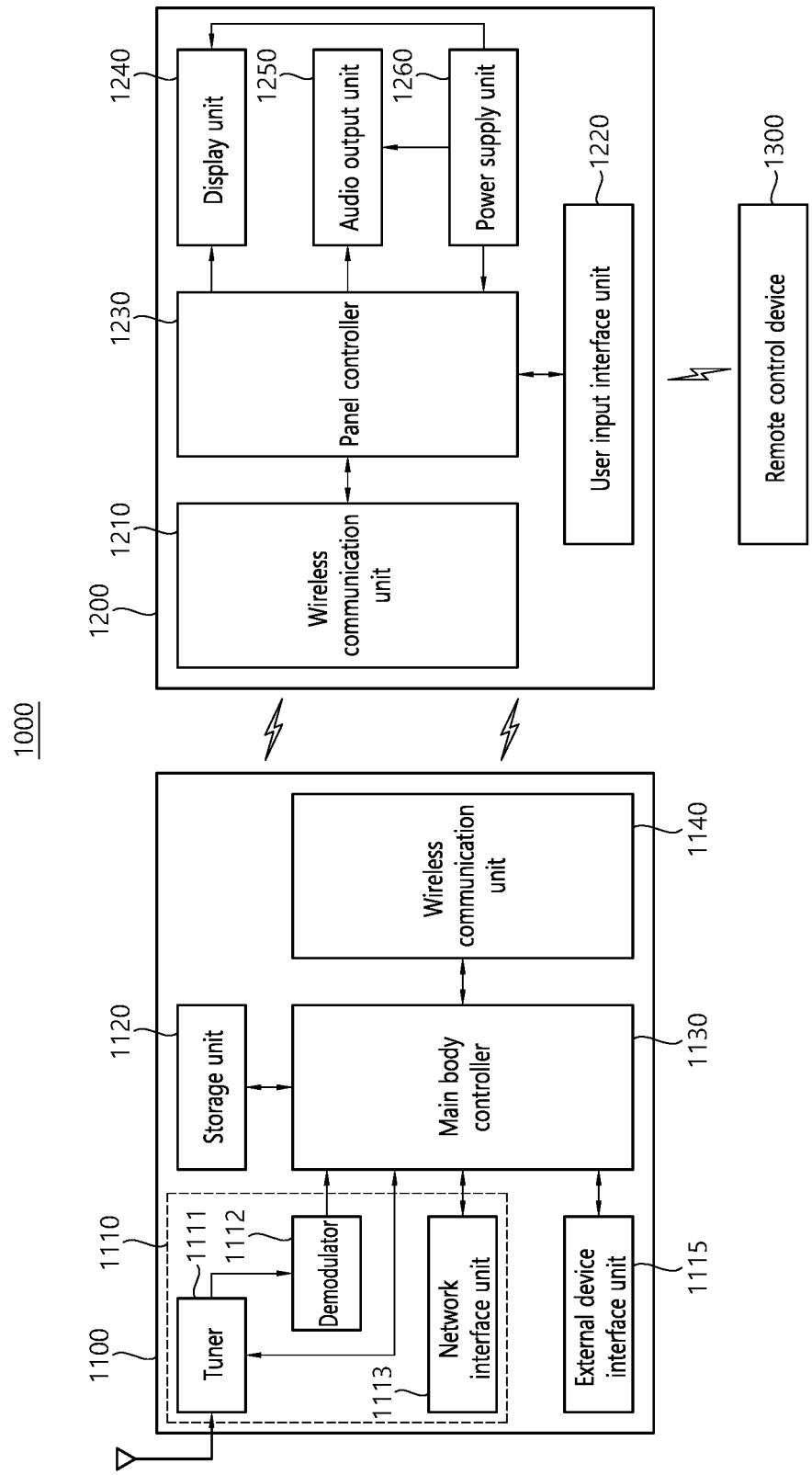
FIG. 25 is a block diagram showing an example of applying a wireless device which performs channel tracking according to one present embodiment.

FIG. 25 is a block diagram showing an example of applying a wireless device which performs channel tracking according to one present embodiment.

Referring to FIG. 25, a display device 1000 may include a main body device 1100 and a panel device 1200.

The main body device 1100 may include a broadcast receiving unit 1110, an external device interface unit 1115, a storage unit 1120, a main body control unit 1130, and a wireless communication circuit 1140.

The broadcast receiving unit 1110 may include a tuner 1111, a demodulation unit 1112, and a network interface unit 1113.

The tuner 1111 may select a specific broadcast channel according to a channel selection command. The tuner 1111 may receive a broadcast signal for the selected specific broadcast channel.

The demodulation unit 1112 may separate the received broadcast signal into a video signal, an audio signal, and a data signal related to a broadcast program, and may restore the separated video signal, audio signal, and data signal into a format which can be output.

The network interface unit 1113 may provide an interface for coupling the display device 1000 to a wired/wireless network including an Internet network. The network interface unit 1113 may transmit or receive data with another user or another electronic device through an accessed network or another network linked to the accessed network.

The network interface unit 1113 may access a predetermined webpage through the accessed network or another network linked to the accessed network. That is, data can be transmitted or received with a corresponding server by accessing the predetermined webpage through the network.

In addition, the network interface unit 1113 may receive content or data provided by a content provider or a network operator. That is, the network interface unit 1113 may receive content such as movies, advertisements, games, VODs, broadcast signals, or the like provided from the content provider or the network operator through the network, and information related to the content.

In addition, the network interface unit 1113 may receive update information and update files of firmware provided by the network operator, and may transmit data to the Internet or content provider or the network operator.

The network interface unit 1113 may select and receive a desired application among applications open to the public through the network.

The external device interface unit 1115 may receive an application or an application list in an adjacent external device and transfer it to the storage unit 1120 or the main body control unit 1130.

The external device interface unit 1115 may provide a connection path between the display device 1000 and the external device. The external device interface unit 1115 may receive one or more of video and audio output from the external device coupled in a wireless or wired manner to the display device 1000, and may transfer it to the main body control unit 1130. The external device interface unit 1115 may include a plurality of external input terminals. The plurality of external input terminals may include an RGB terminal, one or more high definition multimedia interface (HDMI) terminals, and a component terminal.

A video signal of the external device, which is input through the external device interface unit 1115, may be output through the display unit 1240 via a wireless communication unit. An audio signal of the external device, which is input through the external device interface unit 1115, may be output through an audio output unit 1250.

The external device that can be coupled with the external device interface unit 1115 may be any one of a set-top box, a Blu-ray player, a DVD player, a game device, a sound bar, a smartphone, a PC, a USB memory, and a home theater, but this is for exemplary purposes only.

In addition, part of content data stored in the display device 1000 may be transmitted to a selected user or a selected electronic device among other users or other electronic devices pre-stored in the display device 1000.

The storage unit 1120 may store a program for processing and controlling each signal in the main body control unit 1130, and may store signal-processed video, audio, or data signals.

In addition, the storage unit 1120 may perform a function for temporarily storing a video, audio, or data signal input from the external device interface unit 1115 or the network interface unit 1113, and may store information related to a predetermined image through a channel memory function.

The storage unit 1120 may store an application or an application list input from the external device interface unit 1115 or the network interface unit 1113.

The display device 1000 may reproduce a content file (moving picture file, still picture file, music file, document file, application file, etc.) stored in the storage unit 1120 and provide it to a user.

The main body control unit 1130 may control an overall operation in the display device 1000 of the main body device 1100.

Finally, in order to display a picture on the display unit 1240, the main body control unit 1130 may operate the panel control unit 1230 through a control signal. For example, the main body control unit 1130 may provide control such that a broadcast picture input through the tuner 1111, an external input picture input through the external device interface unit 1115, a picture input through the network interface unit 1113, or a picture stored in the storage unit 1120 is displayed on the display unit 1240. In this case, the picture displayed on the display unit 1240 may be a still picture or a moving picture, and may be a 2D picture or a 3D picture.

A video signal processed in the main body control unit 1130 may be input to the display unit 1240 via the wireless communication units 1140 and 1210 and may be displayed as a picture corresponding to the video signal. In addition, the video signal processed in the main body control unit 1130 may be input to an external output device through the external device interface unit 1115.

An audio signal processed in the main body control unit 1130 may be output to the audio output unit 1250 via the wireless communication units 1140 and 1210. In addition, the audio signal processed in the main body control unit 1130 may be input to the external output device through the external device interface unit 1115.

The wireless communication unit 1140 may be wirelessly coupled to the wireless communication unit 1210 included in the panel device 1200 according to a specific communication protocol. The wireless communication unit 1140 may transmit, to the panel device 1200, information received from the main body control unit 1130, or may receive information from the panel device 1200.

The panel device 1120 may include a wireless communication unit 1210, a user input interface unit 1220, a panel control unit 1230, a display unit 1240, an audio output unit 1250, and a power supply unit 1260.

The wireless communication unit 1210 may be wirelessly coupled to the wireless communication unit 1140 included in the main body device 1100 according to a specific communication protocol. The wireless communication unit 1210 may transmit, to the main body device 1100, information received from the panel control unit 1230, or may receive information from the main body device 1100.

The user input interface unit 1220 may transfer a signal input by the user to the panel control unit 1230 or transfer a signal from the panel control unit 1230 to the user.

For example, according to various communication schemes such as Bluetooth, ultra wideband (WB), Zigbee, a radio frequency (RF) communication scheme, or an infrared (IR) communication scheme, the user input interface unit 1220 may receive from a remote control device 1300 a control signal such as power on/off, channel selection, screen setting, or the like, or may transmit the control signal from the panel control unit 1230 to the remote control device 1300.

In addition, the user input interface unit 1220 may transfer to the panel control unit 1230 a control signal input from a local key (not shown) such as a power key, a volume key, a set value, or the like.

In addition, the panel control unit 1230 may control the panel device 1200 according to an internal program or a user command input through the user input interface unit 1220.

The panel control unit 1230 may allow channel information or the like selected by the user to be output through the display unit 1240 or the audio output unit 1250 together with the processed picture or audio signal.

In addition, the panel control unit 1230 may allow a video signal or an audio signal, provided from an external device, for example, a camera or a camcorder, input through the external device interface unit 1115, to be output through the display unit 1240 or the audio output unit 1250, according to an external device picture playback command received through the user input interface unit 1220.

The operation of performing channel tracking mentioned through the present specification may be supported by the panel control unit 1230.

The display unit 1240 may generate a driving signal by converting a video signal, data signal, or OSD signal processed in the main body control unit 1130 and a video signal, data signal, or the like received in the external device interface unit 1115 into R, G, B signals.

Meanwhile, since the display device 1000 of FIG. 25 are only one embodiment of the present specification, some of components illustrated herein may be integrated, added, or omitted according to specifications of the display device 1000 implemented in practice.

According to another embodiment of the present specification, unlike in FIG. 25, the display device 1000 does not include the tuner 1111 and the demodulation unit 1112, and may receive a picture through the network interface unit 1113 or the external device interface unit 1115 to reproduce the picture.

For example, the display device 1000 may be implemented by being divided into a picture processing device such as a set-top box or the like for receiving a broadcast signal or content according to various network services and a content reproducing device for reproducing content input from the picture processing device.

Although a detailed embodiment is described in the detailed description of the present specification, it will be apparent that various modifications can be made without departing from the scope of the present specification. And, therefore, the scope of the present specification shall not be limited only to the above-described embodiment and shall rather be determined based on the scope of the claims that will hereinafter be described as well as the equivalents of the scope of the claims of the present disclosure.

What is claimed is:

1. A method of performing channel tracking in a wireless audio and video (AV) system, the method comprising:
   receiving, by a first wireless device, a radio signal including a first part associated with a preamble and a second part associated with a data block and a guard interval (GI) from a second wireless device;
   estimating, by the first wireless device, an initial channel, based on the preamble;
   estimating, by the first wireless device, a residual channel, based on the GI;
   applying a reconstruction sequence reconstructed based on a Golay sequence having a predetermined length to the GI; and
   updating, by the first wireless device, a channel, based on first information obtained based on the estimation of the initial channel and second information obtained based on the estimation of the residual channel,
   wherein, when the number of channels used for channel bonding in the wireless AV system is '2', a Golay sequence having a length of 64 is applied to the GI if the GI is a short GI,
   wherein, when the number of channels used for channel bonding in the wireless AV system is '2' and when the short GI is applied to the GI, a structure of the Golay sequence for the short GI is defined as $[-Gf_{16}\ Ge_{16} -Gf_{16}]$,
   wherein, when a first sequence $-Gf_{16}$ among the short GI corresponds to $1^{st}$ to $16^{th}$ elements, the $9^{th}$ to $16^{th}$ elements are defined as w0,
   wherein, when a second sequence $-Ge_{16}$ among the short GI corresponds to $17^{th}$ to $32^{nd}$ elements, the $17^{th}$ to $32^{nd}$ elements are defined as w1,
   wherein, when a third sequence $-Gf_{16}$ among the short GI corresponds to $33^{rd}$ to $48^{th}$ elements, the $33^{rd}$ to $40^{th}$ elements are defined as w2, and
   wherein a fourth sequence $-Ge_{16}$ among the short GI corresponds to $49^{th}$ to $64^{th}$ elements,
   wherein the w0, w1 and w2 depend on a space-time stream number or a transmit chain number used to define the $Ge_{16}$ and the $Gf_{16}$,
   wherein the $Ge_{16}$ and the $Gf_{16}$ are a Golay pair which is a pair of complementary sequences,
   wherein the w0, w1 and w2 are defined as $[-1, -1, -1, -1]$ when the space-time stream number or the transmit chain number is 1, and the w0, w1 and w2 are defined as $[1, -1, -1, -1]$ when the space-time stream number or the transmit chain number is 2,
   wherein the reconstructed sequence includes a first sequence corresponding to the w1 and a second sequence corresponding to the w2 and the w0,
   wherein a first Golay sequence is output based on the first sequence,
   wherein a second Golay sequence is output based on the second sequence, and
   wherein the second information is obtained based on a sum of the first and second Golay sequence and a sign.

2. The method of claim 1, wherein, when the number of channels used for channel bonding in the wireless AV system is '1', the GI includes a Golay sequence having a length of 32 upon applying a short GI to the GI, the GI includes a Golay sequence having a length of 64 upon applying a normal GI to the GI, and the GI includes a Golay sequence having a length of 128 upon applying a long GI to the GI.

3. The method of claim 1, wherein, when the number of channels used for channel bonding in the wireless AV system is '2', a Golay sequence having a length of 128 is applied to the GI if the GI is a normal GI, and a Golay sequence having a length of 256 is applied to the GI if the GI is a long GI.

4. The method of claim 1, further comprising performing, by the first wireless device, channel compensation, based on the updated channel.

5. The method of claim 1, wherein the initial channel estimation is performed based on an L-CEF or EDMG-CEF included in the preamble.

6. The method of claim 1, wherein the radio signal is a signal based on a single carrier (SC) mode.

7. A first wireless device for performing channel tracking in a wireless audio and video (AV) system, comprising:
   a transceiver transmitting or receiving a radio signal; and
   a processor controlling the transceiver, wherein the processor is configured to:
   receive a radio signal including a first part associated with a preamble and a second part associated with a data block and a guard interval (GI) from a second wireless device;
   estimate an initial channel, based on the preamble;
   estimate a residual channel, based on the GI;
   apply a reconstruction sequence reconstructed based on a Golay sequence having a predetermined length to the GI; and
   update a channel, based on first information obtained based on the estimation of the initial channel and second information obtained based on the estimation of the residual channel, wherein, when the number of channels used for channel bonding in the wireless AV system is '2', a Golay sequence having a length of 64 is applied to the GI if the GI is a short GI, wherein, when the number of channels used for channel bonding in the wireless AV system is '2' and when the short GI is applied to the GI, a structure of the Golay sequence for the short GI is defined as $[-Gf_{16}\ Ge_{16}-Gf_{16}]$, wherein, when a first sequence $-Gf_{16}$ among the short GI corresponds to $1^{st}$ to $16^{th}$ elements, the $9^{th}$ to $16^{th}$ elements are defined as w0, wherein, when a second sequence $Ge_{16}$ among the short GI corresponds to $17^{th}$ to $32^{nd}$ elements, the $17^{th}$ to $32^{nd}$ elements are defined as w1, wherein, when a third sequence $-Gf_{16}$ among the short GI corresponds to $33^{rd}$ to $48^{th}$ elements, the $33^{rd}$ to $40^{th}$ elements are defined as w2, and wherein a fourth sequence $-Ge^{16}$ among the short GI corresponds to $49^{th}$ to $64^{th}$ elements, wherein the w0, w1 and w2 depend on a space-time stream number or a transmit chain number used to define the $Ge_{16}$ and the $Gf_{16}$, wherein the $Ge_{16}$ and the $Gf_{16}$ are a Golay pair which is a pair of complementary sequences, wherein the w0, w1 and w2 are defined as [−1, −1, −1, −1] when the space-time stream number or the transmit chain number is 1, and the w0, w1 and w2 are defined as [1, −1, —1, −1] when the space-time stream number or the transmit chain number is 2, wherein the reconstructed sequence includes a first sequence corresponding to the w1 and a second sequence corresponding to the w2 and the w0, wherein a first Golay sequence is output based on the first sequence, wherein a second Golay sequence is output based on the second sequence, and wherein the second information is obtained.

8. The wireless device of claim 7, wherein, when the number of channels used for channel bonding in the wireless AV system is '1', the GI includes a Golay sequence having a length of 32 upon applying a short GI to the GI, the GI includes a Golay sequence having a length of 64 upon applying a normal GI to the GI, and the GI includes a Golay sequence having a length of 128 upon applying a long GI to the GI.

9. The wireless device of claim 7, wherein, when the number of channels used for channel bonding in the wireless AV system is '2', a Golay sequence having a length of 128 is applied to the GI if the GI is a normal GI, and a Golay sequence having a length of 256 is applied to the GI if the GI is a long GI.

* * * * *